(12) United States Patent
Park et al.

(10) Patent No.: US 11,386,851 B2
(45) Date of Patent: Jul. 12, 2022

(54) DISPLAY DEVICE HAVING DATA LINES IN ROUNDED EDGE AND STRAIGHT EDGE PARTS

(71) Applicant: SAMSUNG DISPLAY CO., LTD., Yongin-si (KR)

(72) Inventors: Gyung Soon Park, Seoul (KR); Seung-Hwan Cho, Yongin-si (KR); Jong Hyun Choi, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 260 days.

(21) Appl. No.: 16/853,295

(22) Filed: Apr. 20, 2020

(65) Prior Publication Data
US 2020/0394967 A1 Dec. 17, 2020

(30) Foreign Application Priority Data
Jun. 13, 2019 (KR) .................... 10-2019-0070040

(51) Int. Cl.
| | | |
|---|---|---|
| G09G 3/30 | (2006.01) | |
| G09G 3/36 | (2006.01) | |
| G02F 1/1333 | (2006.01) | |
| G09G 3/3291 | (2016.01) | |

(52) U.S. Cl.
CPC ... *G09G 3/3291* (2013.01); *G09G 2310/0262* (2013.01); *G09G 2370/08* (2013.01)

(58) Field of Classification Search
CPC .. G02F 1/1333–133391; G09G 3/3291; G09G 2370/08; G09G 2310/0262
See application file for complete search history.

(56) References Cited

U.S. PATENT DOCUMENTS

| | | | | |
|---|---|---|---|---|
| 2018/0070461 | A1* | 3/2018 | Lee | G09G 3/3225 |
| 2019/0206976 | A1* | 7/2019 | Jeong | H01L 27/3246 |
| 2019/0265824 | A1* | 8/2019 | Abe | G06F 3/0443 |
| 2019/0279555 | A1* | 9/2019 | Kim | G09G 3/3685 |
| 2021/0020111 | A1* | 1/2021 | Yamada | H01L 27/3276 |

(Continued)

FOREIGN PATENT DOCUMENTS

| | | |
|---|---|---|
| CN | 108254984 | 7/2018 |
| EP | 3 462 499 | 3/2019 |

(Continued)

OTHER PUBLICATIONS

Extended European Search Report dated Oct. 19, 2020 for European Application Serial No. 20179351.0.

*Primary Examiner* — Sanghyuk Park
(74) *Attorney, Agent, or Firm* — F. Chau & Associates, LLC

(57) ABSTRACT

A display device includes a display portion having a substantially rectangular area with rounded edges in which a plurality of data lines are arranged. The display device includes a first area corresponding to a rounded edge part and a second area corresponding to a straight edge part adjacent to the first area. A data driving circuit includes a plurality of output channels configured to output data voltages. Odd-numbered output channels output data voltages according to a sequential arrangement of data lines in the second area. Even-numbered output channels output data voltages according to a reverse sequential arrangement of data lines in the first area.

20 Claims, 9 Drawing Sheets

(56) References Cited

U.S. PATENT DOCUMENTS

2021/0027716 A1\* 1/2021 Yamada ............... G09G 3/3266
2021/0296424 A1\* 9/2021 Cho .................... H01L 27/3265

FOREIGN PATENT DOCUMENTS

| EP | 3 716 002 | 9/2020 |
| KR | 10-2018-0125061 | 11/2018 |
| WO | WO 2020/091228 | 5/2020 |

\* cited by examiner

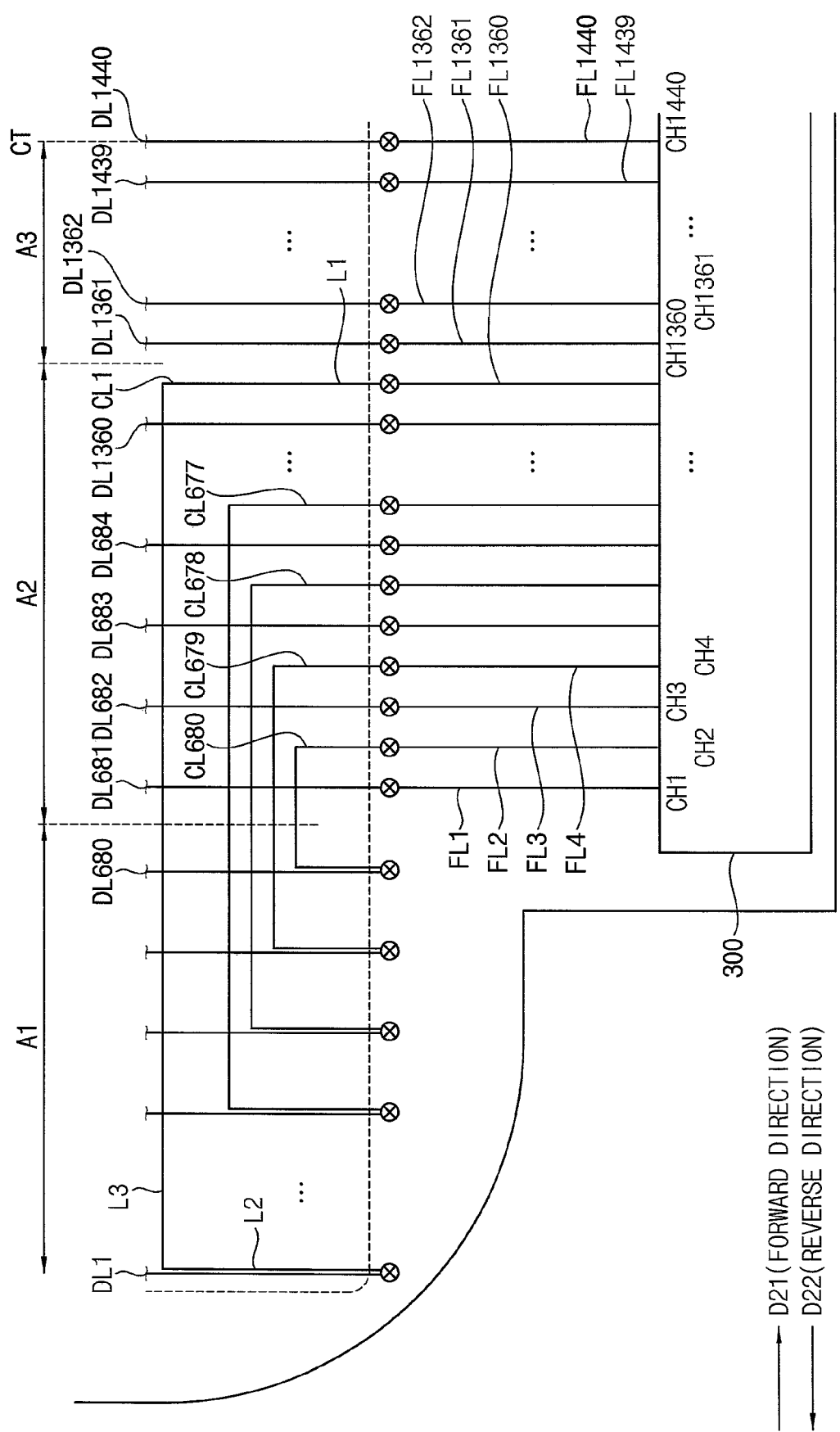

DISPLAY DEVICE HAVING DATA LINES IN ROUNDED EDGE AND STRAIGHT EDGE PARTS

CROSS-REFERENCE TO RELATED APPLICATION

This application claims priority under 35 USC § 119 to Korean Patent Application No. 10-2019-0070040 filed on Jun. 13, 2019 in the Korean Intellectual Property Office (KIPO), the entire disclosure of which is incorporated herein by reference.

TECHNICAL FIELD

The present disclosure relates to a display device and, more particularly, to a display device having data lines in rounded edge and straight edge parts.

DISCUSSION OF THE RELATED ART

Modern display products are being offered in smaller sizes, lighter weights. These display products may additionally offer better performance than traditional display products. For example, modern display products may have higher resolutions, brighter displays, higher contrast, faster response times, and various other desirable properties. Conventional cathode ray tube (CRT) televisions have been widely used for display devices with many advantages in terms of performance and price. Modern display devices, however, are known for having flat panel structures in which the display device is relatively thin, as compared to CRT displays. Examples of flat panel display types include plasma display devices, liquid crystal display devices, and organic light emitting diode (OLED) display device. Each of these flat panel display types offers thinner, lighter structures that consume less power, as compared with CRT displays.

In general, flat panel display devices include a display portion for displaying an image and a peripheral portion which is a non-display area at least partially surrounding the display portion. The non-display area of the display device is generally hidden behind a bezel, which is like a frame around the active area of the display device. It is generally preferable to keep the bezel as thin as possible so as to increase the aesthetic quality of the display device and to make it easier to integrate into smaller sized portable electronic devices.

SUMMARY

According to exemplary embodiments of the present disclosure, a display device includes a display portion having a substantially rectangular area with rounded edges in which a plurality of data lines are arranged. The display portion includes a first area corresponding to a rounded edge part and a second area corresponding to a straight edge part adjacent to the first area. A data driving circuit includes a plurality of output channels configured to output data voltages. Odd-numbered output channels output data voltages according to an arrangement sequence of data lines arranged in the second area, and even-numbered output channels output data voltages according to a reverse arrangement sequence of data lines arranged in the first area.

In exemplary embodiments of the present disclosure, the display device may further include a plurality of fan-out lines arranged in a fan-out area between the data driving circuit and the second area. The fan-out lines may be electrically connected to the output channels.

In exemplary embodiments of the present disclosure, the display device may further include a plurality of bypass lines arranged in the first and second areas. Each of the bypass lines may include a first straight portion disposed between the data lines arranged in the second area and including an end electrically connected to the fan-out line, a crossing portion crossing the data lines, and a second straight portion disposed between the data lines arranged in the first area and including an end electrically connected to the data lines arranged in the first area.

In exemplary embodiments of the present disclosure, odd-numbered fan-out lines may electrically connect the odd-numbered output channels to the data lines arranged in the second area. Even-numbered fan-out lines may electrically connect the even-numbered output channels to the bypass lines arranged in the second area.

In exemplary embodiments of the present disclosure, the display portion may further include a third area adjacent to the second area and corresponding to the straight edge part of the display portion.

In exemplary embodiments of the present disclosure, the data driving circuit may further include a plurality of output channels configured to output data voltages according to an arrangement sequence of data lines arranged in the third area.

According to exemplary embodiments of the present disclosure, a display device includes a display portion having a substantially rectangular area with rounded edges in which a plurality of data lines are arranged. The display device includes a first area corresponding to a rounded edge part and a second area corresponding to a straight edge part adjacent to the first area. A data driving circuit includes an n-demux configured to output a data voltage for each group formed by binding n output channels and a plurality of output channels configured to output a plurality of data voltages. Output channels of odd-numbered groups may output data voltages according to an arrangement sequence of the data lines arranged in the second area, and output channels of even-numbered groups may output data voltages according to a reverse arrangement sequence of the data lines arranged in the first area.

In exemplary embodiments of the present disclosure, the display device may further include a plurality of fan-out lines arranged in a fan-out area between the data driving circuit and the second area and electrically connected to the output channels.

In exemplary embodiments of the present disclosure, the display device may further include a plurality of bypass lines arranged in the first and second areas. Each of the bypass lines may include a first straight portion disposed between the data lines arranged in the second area and including an end electrically connected to the fan-out line, a crossing portion crossing the data lines, and a second straight portion disposed between the data lines arranged in the first area and including an end electrically connected to the data lines arranged in the first area.

In exemplary embodiments of the present disclosure, when the data driving circuit includes a 2-demux, the (4N−3)th fan-out lines electrically connected to (4N−3)th output channels may be electrically connected to first data lines arranged in the second area. The (4N−2)th fan-out lines electrically connected to (4N−2)th output channels may be electrically connected to second data lines arranged in the second area. The (4N−1)th fan-out lines electrically connected to (4N−1)th output channels may be electrically conconnected to first straight portions of first bypass lines between the first data lines and the second data lines arranged in the second area. The (4N)th fan-out lines electrically connected to (4N)th output channels may be electrically connected to first straight portions of second bypass lines between the second data lines and third data lines arranged in the second area. Here, N is a positive integer.

In exemplary embodiments of the present disclosure, when the data driving circuit includes a 4-demux, the (8N−7)th fan-out lines electrically connected to (8N−7)th output channels may be electrically connected to first data lines arranged in the second area. The (8N−6)th fan-out lines electrically connected to (8N−6)th output channels may be electrically connected to second data lines arranged in the second area. The (8N−5)th fan-out lines electrically connected to (8N−5)th output channels may be electrically connected to third data lines arranged in the second area. The (8N−4)th fan-out lines electrically connected to (8N−4)th output channels may be electrically connected to fourth data lines arranged in the second area. The (8N−3)th fan-out lines electrically connected to (8N−3)th output channels may be electrically connected to first straight portions of first bypass lines between the first data lines and the second data lines arranged in the second area. The (8N−2)th fan-out lines electrically connected to (8N−2)th output channels may be electrically connected to first straight portions of second bypass lines between the second data lines and the third data lines arranged in the second area. The (8N−1)th fan-out lines electrically connected to (8N−1)th output channels may be electrically connected to first straight portions of third bypass lines between the third data lines and the fourth data lines arranged in the second area. The (8N)th fan-out lines electrically connected to (8N)th output channels may be electrically connected to first straight portions of fourth bypass lines between the fourth data lines and fifth data lines arranged in the second area. Here, N is a positive integer.

In exemplary embodiments of the present disclosure, the display portion may further include a third area adjacent to the second area and corresponding to the straight edge part.

In exemplary embodiments of the present disclosure, the data driving circuit may further include a plurality of output channels configured to output data voltages according to an arrangement sequence of data lines arranged in the third area.

According to exemplary embodiments of the present disclosure, a display device includes a display portion having a substantially rectangular area with rounded edges in which a plurality of data lines are arranged. The display device includes a first area corresponding to a rounded edge part and a second area corresponding to a straight edge part adjacent to the first area. A data driving circuit including an n-demux is configured to output a data voltage for each group formed by binding n output lines and a plurality of output channels electrically connected to a plurality of output lines of the n-demux. Odd-numbered output channels output data voltages according to an arrangement sequence of data lines arranged in the second area. Even-numbered output channels output data voltages according to a reverse arrangement sequence of data lines arranged in the first area.

In exemplary embodiments of the present disclosure, the display device may further include a plurality of fan-out lines arranged in a fan-out area between the data driving circuit and the second area and electrically connected to the output channels.

In exemplary embodiments of the present disclosure, the display device may further include a plurality of bypass lines arranged in the first and second areas. Each of the bypass lines may include a first straight portion disposed between the data lines arranged in the second area and including an end electrically connected to a fan-out line, a crossing portion crossing the data lines, and a second straight portion disposed between the data lines arranged in the first area and including an end electrically connected to the data line arranged in the first area.

In exemplary embodiments of the present disclosure, when the data driving circuit includes a 2-demux, the (4N−3)th output lines may be electrically connected to (4N−3)th output channels. The (4N−2)th output lines may be electrically connected to (4N−1)th output channels. The (4N−1)th output lines may be electrically connected to (4N−2)th output channels. The (4N)th output lines may be electrically connected to (4N)th output channels. Here, N is a positive integer.

In exemplary embodiments of the present disclosure, when the data driving circuit includes a 4-demux, the (8N−7)th output lines may be electrically connected to (8N−7)th output channels. The (8N−6)th output lines may be electrically connected to (8N−5)th output channels. The (8N−5)th output lines may be electrically connected to (8N−3)th output channels. The (8N−4)th output lines may be electrically connected to (8N−1)th output channels. The (8N−3)th output lines may be electrically connected to (8N−6)th output channels. The (8N−2)th output lines may be electrically connected to (8N−4)th output channels. The (8N−1)th output lines may be electrically connected to (8N−2)th output channels. The (8N)th output lines may be electrically connected to (8N)th output channels. Here, N is a positive integer.

In exemplary embodiments of the present disclosure, the display portion may further include a third area adjacent to the second area and corresponding to a straight edge part.

In exemplary embodiments of the present disclosure, the data driving circuit may further include a plurality of output channels configured to output data voltages according to an arrangement sequence of data lines arranged in the third area.

Therefore, a display device according to exemplary embodiments of the present disclosure may simplify an arrangement of fan-out lines by changing a sequence of data voltages output from a plurality of output channels of a data driving circuit. Thus, the display device may reduce a non-display area of the display device and line resistance.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 9 is a plan diagram describing output channels of a driving circuit electrically connected to fan-out lines shown in FIG. 8.

DETAILED DESCRIPTION OF THE EMBODIMENTS

Illustrative, non-limiting exemplary embodiments of the present disclosure will be more clearly understood from the following detailed description, in conjunction with the accompanying drawings.

Figure 1:
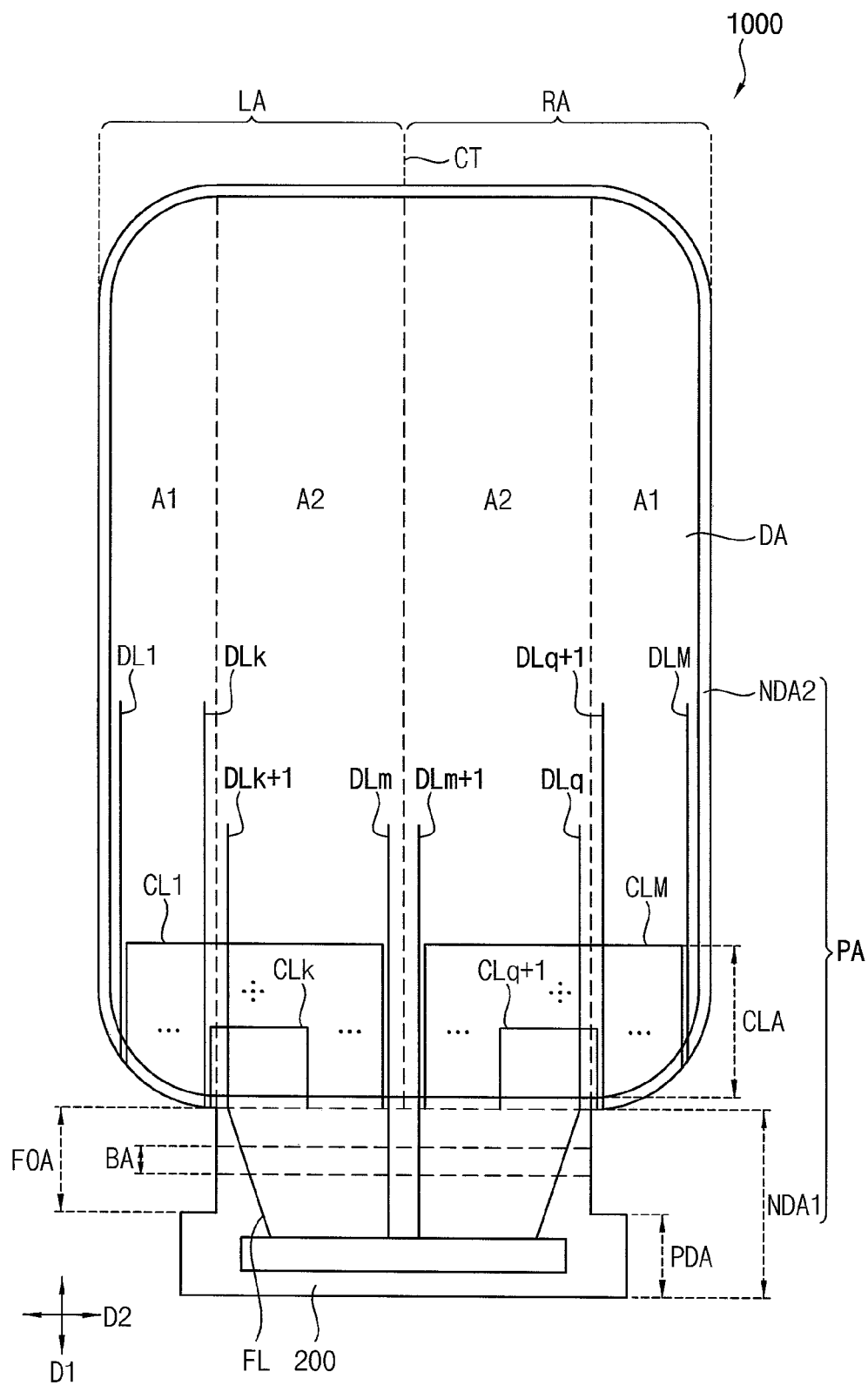
FIG. 1 is a plan diagram illustrating a display device according to exemplary embodiments of the present disclosure.

FIG. 1 is a plan diagram illustrating a display device according to exemplary embodiments of the present disclosure.

Referring to FIG. 1, the display device 1000 may include a display portion (e.g. display area) DA configured to display an image and a peripheral portion (e.g. peripheral area) PA adjacent to and at least partially surrounding the display portion DA.

The display portion DA may have a substantially rectangular shape having rounded edges defined in a first direction D1 and a second direction D2 that is perpendicular to the first direction D1 when viewed in a plan view. Thus, the shape of the display portion DA may be referred to herein as a rounded rectangle.

The display portion DA may include a first side area LA and a second side area RA that are laterally symmetrical (e.g. mirror symmetry) with respect to a center line CT extending primarily in the first direction D1. Each of the first and second side areas LA and RA may include a first area A1 and a second area A2. The first area A1 may be an area corresponding to a rounded edge of the display portion DA (e.g. areas A1 may each be semi-stadium shaped), and the second area A2 may be an area corresponding to a straight edge of the display portion DA adjacent to the rounded edge area (e.g. areas A2 may each be rectangular).

The display portion DA may include a plurality of pixels arranged in various forms (e.g., a matrix form, etc.) and including thin film transistors to display the image and a plurality of data lines DL1 to DLM electrically connected to the pixels. In addition, the display portion DA may include a plurality of gate lines crossing the data lines DL1 to DLM.

The data lines DL1 to DLM may extend primarily in the first direction D1 and may be arranged in the second direction D2. The gate lines may extend primarily in the second direction D2 and be arranged in the first direction DL.

In addition, 1st to m-th data lines DL to DLm may be arranged in the first side area LA, and (m+1)th to M-th data lines DLm+1 to DLM may be arranged in the second side area RA.

In addition, 1st to k-th data lines DL1 to DLk among the 1st to m-th data lines DL1 to DLm may be arranged in the first area A1 of the first side area LA, and (k+1)th to m-th data lines DLk+1 to DLm may be arranged in the second area A2 of the first side area LA.

In addition, (m+1)th to q-th data lines DLm+1 to DLq among the (m+1)th to M-th data lines DLm+1 to DLM may be arranged in the first area A1 of the second side area RA, and (q+1)th to M-th data lines DLq+1 to DLM may be arranged in the second area A2 of the second side area RA, where k, m, q and M are positive integers (k<m<q<M).

The display portion DA may include a bypass line area CLA in which a plurality of bypass lines CL1 to CLk and CLq+1 to CLM are arranged. Each of the bypass lines CL1 to CLk and CLq+1 to CLM may include a straight portion disposed between the data lines, a second straight portion facing the first straight portion, and a crossing portion crossing the data lines and electrically connecting the first straight portion to the second straight portion.

The 1st to k-th bypass lines CL1 to CLk may be electrically connected to the 1st to k-th data lines DL1 to DLk arranged in the first area A1 of the first side area LA.

In addition, the (q+1)th to M-th bypass lines CLq+1 to CLM may be electrically connected to the (q+1)th to M-th data lines DLq+1 to DLM arranged in the first area A1 of the second side area RA.

The peripheral portion PA may include a first non-display area NDA1 and a second non-display area NDA2. The first non-display area NDA1 may be an area extending primarily in the first direction D1 from the straight edge part corresponding to the second areas A2 of the display portion DA. The first non-display area NDA1 might not be present in the rounded edge part corresponding to the first area A1 of the display portion DA.

The first non-display area NDA1 may include a pad area PDA and a fan-out area FOA. The pad area PDA refers to an area in which a data driving circuit 200 and a plurality of pads are mounted. The plurality of pads come into contact with output channels of the data driving circuit 200 in the pad area PDA.

A plurality of fan-out lines FL may be arranged in the fan-out area FAO. The fan-out lines FL may electrically connect the output channels of the data driving circuit 200 to the data lines DL1 to DLM and the bypass lines CL1 to CLk and CLq+1 to CLM.

In an exemplary embodiment of the present disclosure, the fan-out area FAQ may include a bending area BA. The bending area BA may be an area of the first non-display area NDA1 that is bent toward a rear side of the display device during module-assembling process.

The second non-display area NDA2 may at least partially surround an outer periphery of the display portion DA.

A plurality of contact portions electrically connecting the data lines to the bypass lines may be disposed in the second non-display area NDA2 corresponding to the rounded edge part. In addition, a plurality of contact portions electrically connecting the fan-out lines to the data lines may be disposed in the second non-display area NDA2 corresponding to the straight edge part. In addition, a gate driving circuit, which generates a plurality of gate signals to drive the gate lines, may be integrated in the second non-display area NDA2.

Figure 2:
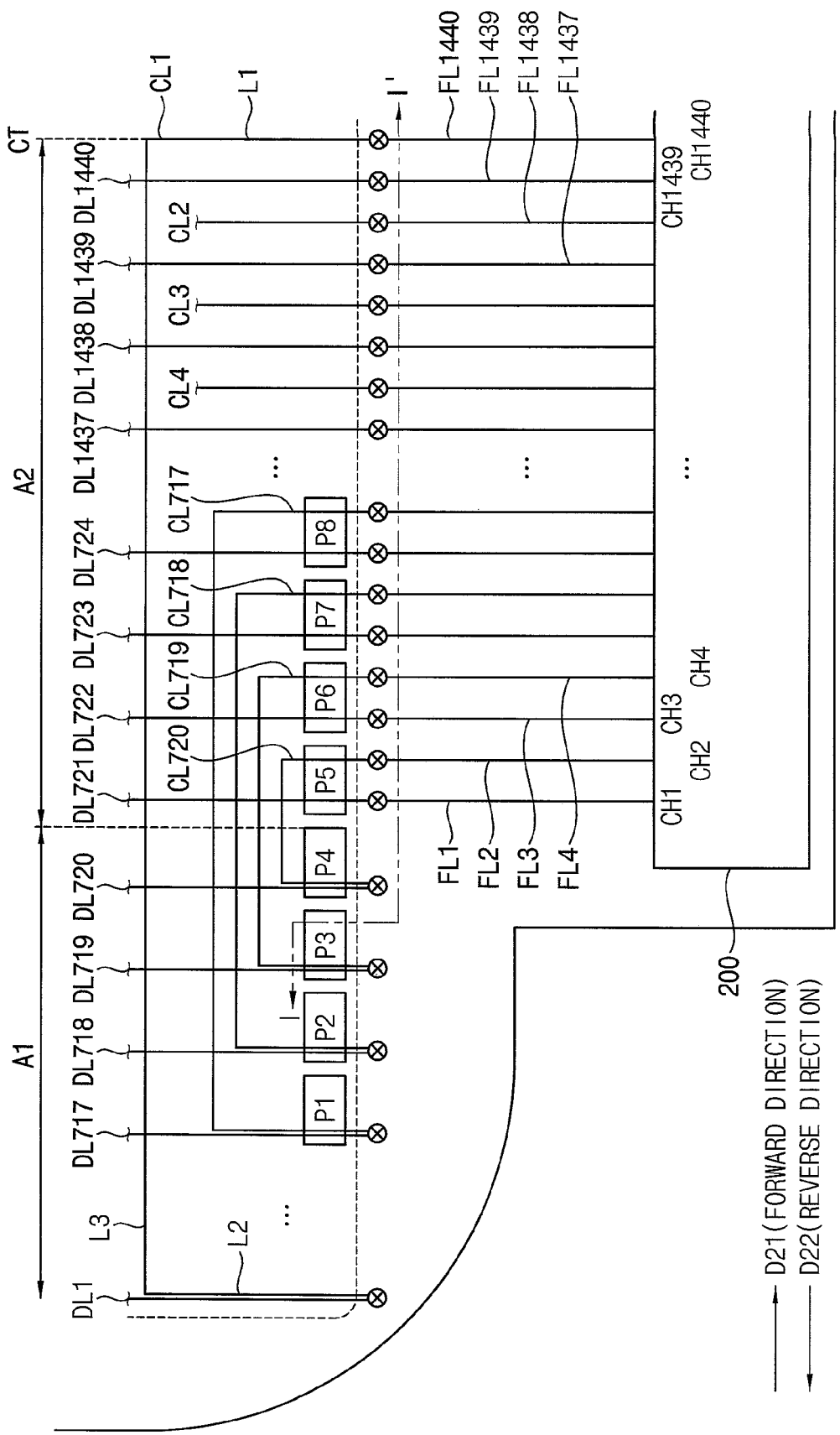
FIG. 2 is a plan diagram describing output channels of a driving circuit electrically connected to fan-out lines shown in FIG. 1.

FIG. 2 is a plan diagram describing output channels of a driving circuit electrically connected to fan-out lines shown in FIG. 1.

In an exemplary embodiment of the present disclosure, the display device may include 1st to 2880-th data lines, and the data driving circuit 200 may include 1st to 2880-th output channels configured to output data voltages corresponding to the 1 st to 2880-th data lines.

Referring to FIGS. 1 and 2, the first side area LA and the second side area RA of the display portion DA may be laterally symmetrical (e.g. mirror symmetry) with respect to the center line CT of the display portion DA.

Hereinafter, a structural relationship and an interconnection relationship between 1st to 1440-th data lines DL1 to DL1440 arranged in the first side area LA of the display portion DA, 1st to 720-th bypass lines CL1 to CL720, 1st to 1440-th fan-out lines FL1 to FL1440 arranged in the fan-out area FAO, and the 1 st to 1440-th output channels CH1 to CH1440 of the data driving circuit 200 will be described.

The 1st to 1440-th data lines DL1 to D1440 may be sequentially arranged along a first side direction (e.g., a forward direction D21) of the second direction D2. The 1st to 720-th data lines DL1 to DL720 may be sequentially arranged along the forward direction D21 in the first area A1. The 721st to 1440-th data lines DL721 to DL1440 may be sequentially arranged along the forward direction D21 in the second area A2.

The 1st to 1440-th fan-out lines FL1 to FL1440 may be sequentially arranged along the forward direction D21. Odd-numbered fan-out lines FL1, FL3, . . . , and FL1439, among the 1st to 1440-th fan-out lines FL1 to FL1440, may be electrically connected to 721st to 1440-th data lines DL721 to DL1440 arranged in the second area A2.

Even-numbered fan-out lines FL2, FL4, . . . , and FL1440 of the 1st to 1440-th fan-out lines FL1 to FL1440 may be electrically connected to the 1st to 720-th bypass lines CL1 to CL720.

The 1st to 720-th bypass lines CL1 to CL720 may include first straight portions L1 arranged between the 721st to 1440-th data lines DL721 to DL1440 in the second area A2, second straight portions L2 arranged between the 1st to 720-th data lines DL1 to DL720 in the first area A1, and crossing portions L3 crossing the 1st to 1440-th data lines DL1 to DL1440 arranged in the first and second areas A1 and A2.

For example, a first straight portion L1 of the first bypass line CL1 may be electrically connected to an end of the 1440-th fan-out line FL1440, and a second straight portion L2 of the 1st bypass line CL1 may be electrically connected to an end of the 1st data line DL1.

A first straight portion L1 of the 720-th bypass line CL720 may be electrically connected to an end of the 2nd fan-out line FL2, and a second straight portion L2 of the 720-th bypass line CL720 may be electrically connected to an end of the 720-th data line DL720.

The data driving circuit 200 may include a plurality of output channels CH1 to CH1440.

The 1st to 1440-th output channels CH1 to CH1440 may be arranged along the forward direction D21 and may be electrically connected to the fan-out lines FL1 to FL1440 arranged in the forward direction D21.

Odd-numbered output channels CH1, CH3, . . . , and CH1439 among the 1st to 1440-th output channels CH1 to CH1440 may output data voltages according to an arrangement sequence of the 721st to 1440-th data lines DL721 to DL1440 arranged in the second area A2.

Even-numbered output channels CH2, CH4, . . . , and CH1440 among the 1st to 1440-th output channels CH1 to CH1440 may output data voltages according to a reverse arrangement sequence of the 1st to 720-th data lines DL1 to DL720 arranged in the first area A1.

As described above, the odd (or even)-numbered output channels among the output channels of the data driving circuit may be directly electrically connected to the data lines, and the even (or odd)-numbered output channels of the output channels may be electrically connected to the data lines through the bypass lines. The odd (or even)-numbered output channels of the data driving circuit may output data voltages according to an arrangement sequence of the data lines arranged in the second area, and the even (or odd)-numbered output channels of the data driving circuit may output data voltages according to a reverse arrangement sequence of the data lines arranged in the first area. It is to be understood that the phrases "odd (or even)" and "even (or odd)" are intended to mean "odd" and "even" or "even" and "odd" but not "odd" and "odd" or "even" and "even". Accordingly, it is to be understood that as used herein, the alternative forms recited in the parentheses are all part of an alternative embodiment while the original forms that are not in the parentheses are all part of a primary embodiment.

Accordingly, a sequence of data voltages outputted from a plurality of output channels of the data driving circuit may be changed, and thus an arrangement of the fan-out lines may be simplified. As a result, the non-display area (or referred to as a dead space) of the display device can be reduced, and the line resistance can be reduced.

Figure 3:
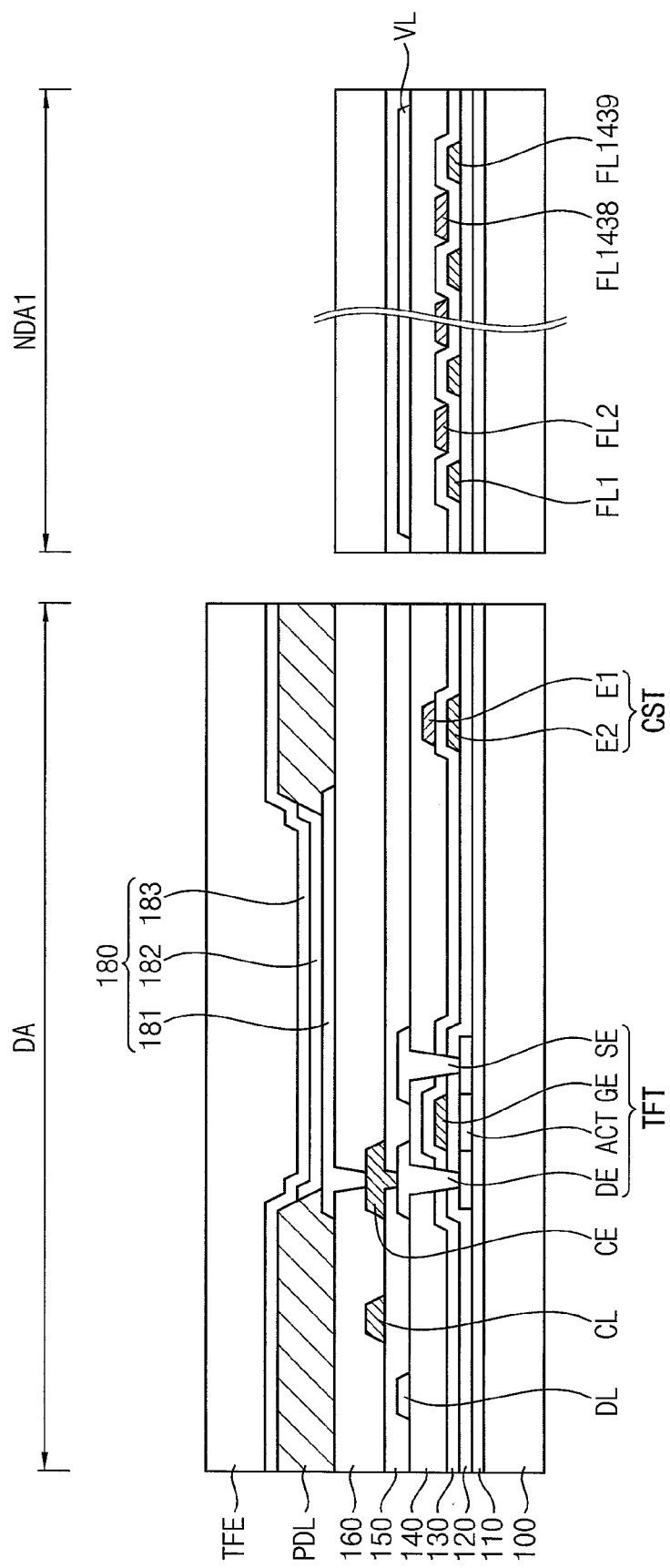
FIG. 3 is a cross-sectional diagram taken along line I-I' in FIG. 2.

FIG. 3 is a cross-sectional diagram taken along line I-I' in FIG. 2.

Referring to FIGS. 2 and 3, the display device may include a display portion DA and a first non-display area NDA1.

The display device may include a base substrate 100. A thin film transistor TFT and an organic light emitting diode (OLED) 180 electrically connected to the thin film transistor TFT may be disposed in the display portion DA of the base substrate 100.

The base substrate 100 may be formed of a transparent or opaque material. For example, the base substrate 100 may include quartz, synthetic quartz, calcium fluoride, fluorine-doped (F-doped) quartz, sodalime glass, non-alkali glass, and the like. In some exemplary embodiments of the present disclosure, the base substrate 100 may be formed of a flexible transparent resin. An example of the transparent resin that may be used for the base substrate 100 may include a polyimide. In this case, the polyimide substrate may include a first polyimide layer, a barrier film layer, a second polyimide layer, and the like. For example, the polyimide substrate may be configured such that the first polyimide layer, the barrier film layer, and the second polyimide layer are laminated on a hard glass substrate.

A buffer layer 110 may prevent metal atoms or impurities from being diffused from the base substrate 100 and may enable a substantially uniform active pattern ACT to be obtained by adjusting the rate of heat transfer during crystallization process to form an active pattern ACT to be described later. In addition, when a surface of the base substrate 100 is not uniform, the buffer layer 110 may serve to increase the flatness of the surface of the base substrate 100. The buffer layer 110 may be formed by using a silicon compound such as silicon oxide (SiOx), silicon nitride (SiNx), silicon oxynitride (SiOxNy), silicon oxycarbide (SiOxCy), and/or silicon carbonitride (SiCxNy).

In an exemplary embodiments of the present disclosure, the active pattern ACT may be disposed on the buffer layer 110. The active pattern ACT may include amorphous silicon or polycrystalline silicon. In an exemplary embodiments of the present disclosure, the active pattern ACT may include an oxide semiconductor including indium (In), gallium (Ga), stannum (Sn), zirconium (Zr), vanadium (V), hafnium (Hf), cadmium (Cd), germanium (Ge), chromium (Cr), titanium (Ti), and/or zinc (Zn).

The active pattern ACT may be included in the thin film transistor TFT disposed in the display portion DA to form a pixel structure. The active pattern ACT may include a drain area and a source area, which are each doped with impurities, and a channel area between the drain area and the source area.

A first insulating layer 120 may be disposed on the active pattern. The first insulating layer 120 may include an inorganic insulating material. For example, the first insulating layer 120 may be formed by using a silicon compound such as silicon oxide (SiOx), silicon nitride (SiNx), silicon oxynitride (SiOxNy), silicon oxycarbide (SiOxCy), and/or silicon carbonitride (SiCxNy).

A first gate pattern may be disposed on the first insulating layer 120. The first gate pattern may be formed of the first gate metal layer. The first gate pattern may include a gate line formed in the display portion DA, a gate electrode GE electrically connected to the gate line, and a first storage electrode E1 and may further include a plurality of fan-out lines FL1 to F1439 formed in the non-display area NDA1.

The first gate pattern may be formed by using a metal, an alloy, a metal nitride, a conductive metal oxide, a transparent conductive material, or the like. For example, the gate pattern may include a metal such as copper and/or aluminum, which are electrically conductive.

A second insulating layer 130 may be disposed on the first insulating layer 120 on which the first gate pattern is disposed. The second insulating layer 130 may include an inorganic insulating material. For example, the second insulating layer 130 may be formed by using a silicon compound such as silicon oxide (SiOx), silicon nitride (SiNx), silicon oxynitride (SiOxNy), silicon oxycarbide (SiOxCy), and/or silicon carbonitride (SiCxNy).

The second gate pattern may be disposed on the second insulating layer 130. The second gate pattern may be formed of the second gate metal layer. The second gate pattern may include a second storage electrode E2 formed in the display portion DA and may include a plurality of fan-out lines FL2 to F1438 formed in the non-display area NDA1.

The second gate pattern may be formed by using a metal, an alloy, a metal nitride, a conductive metal oxide, a transparent conductive material, or the like. For example, the gate pattern may include a metal such as copper and/or aluminum, which are electrically conductive.

A third insulating layer 140 may be disposed on the second insulating layer 120 on which the second gate pattern is disposed. The third insulating layer 140 may include an inorganic insulating material. For example, the third insulating layer 140 may be formed by using a silicon compound such as silicon oxide (SiOx), silicon nitride (SiNx), silicon oxynitride (SiOxNy), silicon oxycarbide (SiOxCy), and silicon carbonitride (SiCxNy).

A first source pattern may be disposed on the third insulating layer 140. The first source pattern may be formed of the first source metal layer. The first source pattern may include data lines DL721, DL722, . . . , and DL1440, a source electrode SE, and a drain electrode DE formed in the display portion DA and may include a power supply voltage line VL formed in the non-display area NDA1.

The first source pattern may have a plurality of layered structures. For example, the first source pattern may include a titanium layer, an aluminum layer on the titanium layer, and titanium on the aluminum layer.

A fourth insulating layer 150 may be disposed on the third insulating layer 140 on which the first source pattern is disposed. For example, the fourth insulating layer 150 may be formed by using a silicon compound such as silicon oxide (SiOx), silicon nitride (SiNx), silicon oxynitride (SiOxNy), silicon oxycarbide (SiOxCy), and/or silicon carbonitride (SiCxNy). Alternatively, the fourth insulating layer 150 may be formed by using a photoresist, a polyacryl-based resin, a polyimide-based resin, an acryl-based resin, or the like.

A second source pattern may be disposed on the fourth insulating layer 150. The second source pattern may be formed of the second source metal layer. The second source pattern may include bypass lines CL1, CL2, . . . , and CL720 formed in the display portion DA and a connection electrode CE electrically connected to the drain electrode DE. The second source pattern may include bypass lines CL1, CL2, . . . , and CL720 formed in the non-display area NDA.

The second source pattern may have a plurality of layered structures. For example, the second source pattern may include a titanium layer, an aluminum layer disposed on the titanium layer, and another titanium layer disposed on the aluminum layer.

A fifth insulating layer 160 may be disposed on the fourth insulating layer 150 on which the second source pattern is disposed. For example, the fifth insulating layer 160 may be formed by using a silicon compound such as silicon oxide (SiOx), silicon nitride (SiNx), silicon oxynitride (SiOxNy), silicon oxycarbide (SiOxCy), and/or silicon carbonitride (SiCxNy). Alternatively, the fifth insulating layer 160 may be formed by using a photoresist, a polyacryl-based resin, a polyimide-based resin, an acryl-based resin, or the like.

An organic light emitting diode 180 may be disposed on the fifth insulating layer 160.

The organic light emitting diode 180 may include a first electrode 181, a light emitting layer 182, and a second electrode 183.

The first electrode 181 may be disposed on the fifth insulating layer 160. According to a light emitting mode of the display device, the first electrode 181 may be formed by using a reflective material or a light-transmitting material. In exemplary embodiments of the present disclosure, the first electrode 181 may be formed by a single layer structure or a multilayer structure including a metal film, an alloy film, a metal nitride film, a conductive metal oxide film, and/or a transparent conductive material film.

A pixel defining layer PDL may be disposed on a via-insulating layer 150 on which the first electrode 181 is disposed. The pixel defining layer PDL may be formed by using an organic material, an inorganic material, or the like. For example, the pixel defining layer PDL may be formed by using a photoresist, a polyacryl-based resin, a polyimide-based resin, an acryl-based resin, a silicon compound, or the like. In exemplary embodiments of the present disclosure, an opening partially exposing the first electrode 181 may be formed by etching the pixel defining layer PDL. A light emitting area and a non-light emitting area of the display device may be defined by the opening of the pixel defining layer PDL. For example, a portion where the opening of the pixel defining layer PDL is located may correspond to the light emitting area, and a portion adjacent to the opening of the pixel defining layer PDL may correspond to the non-light emitting area.

The light emitting layer 182 may be disposed on the first electrode 181 exposed through the opening of the pixel defining layer PDL. In addition, the light emitting layer 182 may extend onto a sidewall of the opening of the pixel defining layer PDL. In an exemplary embodiments of the present disclosure, the light emitting layer 182 may have a multilayer structure including an organic light emitting layer (EL), a hole injection layer (HIL), a hole transport layer (HTL), an electron transport layer (ETL), an electron injection layer (EIL), and the like. In an exemplary embodiments of the present disclosure, except for the organic light emitting layer, the hole injection layer, the hole transport layer, the electron transport layer, the electron injection layer and the like may be commonly formed to correspond to a plurality of pixels. An organic light emitting layer of the light emitting layer 182 may be formed by using light emitting materials capable of generating different color lights such as red light, green light, and blue light according to each pixel of the display device. In some exemplary embodiments of the present disclosure, the organic light emitting layer of the light emitting layer 182 may have a structure that a plurality of light emitting materials, which are capable of implementing different color lights such as red light, green light, and blue light, are laminated to emit white light. The light emitting structures may be commonly formed to correspond to the pixels, and each pixel may be distinguished by the color filter layer.

The second electrode 183 may be disposed on the pixel defining layer PDL and the light emitting layer 182. According to a light emitting mode of the display device, the second electrode 183 may include a light-transmitting material or a reflective material. In exemplary embodiments of the present disclosure, the second electrode 183 may also be formed by a single layer structure or a multilayer structure including a metal film, an alloy film, a metal nitride film, a conductive metal oxide film, and/or a transparent conductive material film.

A thin film encapsulation layer TFE may be disposed on the second electrode 183. The thin film encapsulation layer TFE may prevent penetration of external moisture and oxygen. The thin film encapsulation layer TFE may have at least one organic layer and at least one inorganic layer. The at least one organic layer and the at least one inorganic layer may be alternately laminated. For example, the thin film encapsulation layer TFE may include two inorganic layers and one organic layer therebetween, but the present invention is not limited thereto. In some exemplary embodiments of the present disclosure, a sealing substrate configured to block the external air and moisture from penetrating into the display device may be provided instead of the thin film encapsulation layer.

According to this embodiment, a pan of the fan-out lines arranged in the non-display area may be formed of the first gate metal layer, and the remaining part may be formed of the second gate metal layer. In addition, the bypass lines crossing the fan-out lines may be formed of the second source metal layer. Accordingly, arrangement gaps between the fan-out lines may be reduced, and thus, the non-display area may be reduced.

Hereinafter, the same components as in the previous embodiment will be described with the same reference numerals, and to the extent that some elements are not described in detail, it may be assumed that these elements are at least similar to corresponding elements that have already been described.

Figure 4:
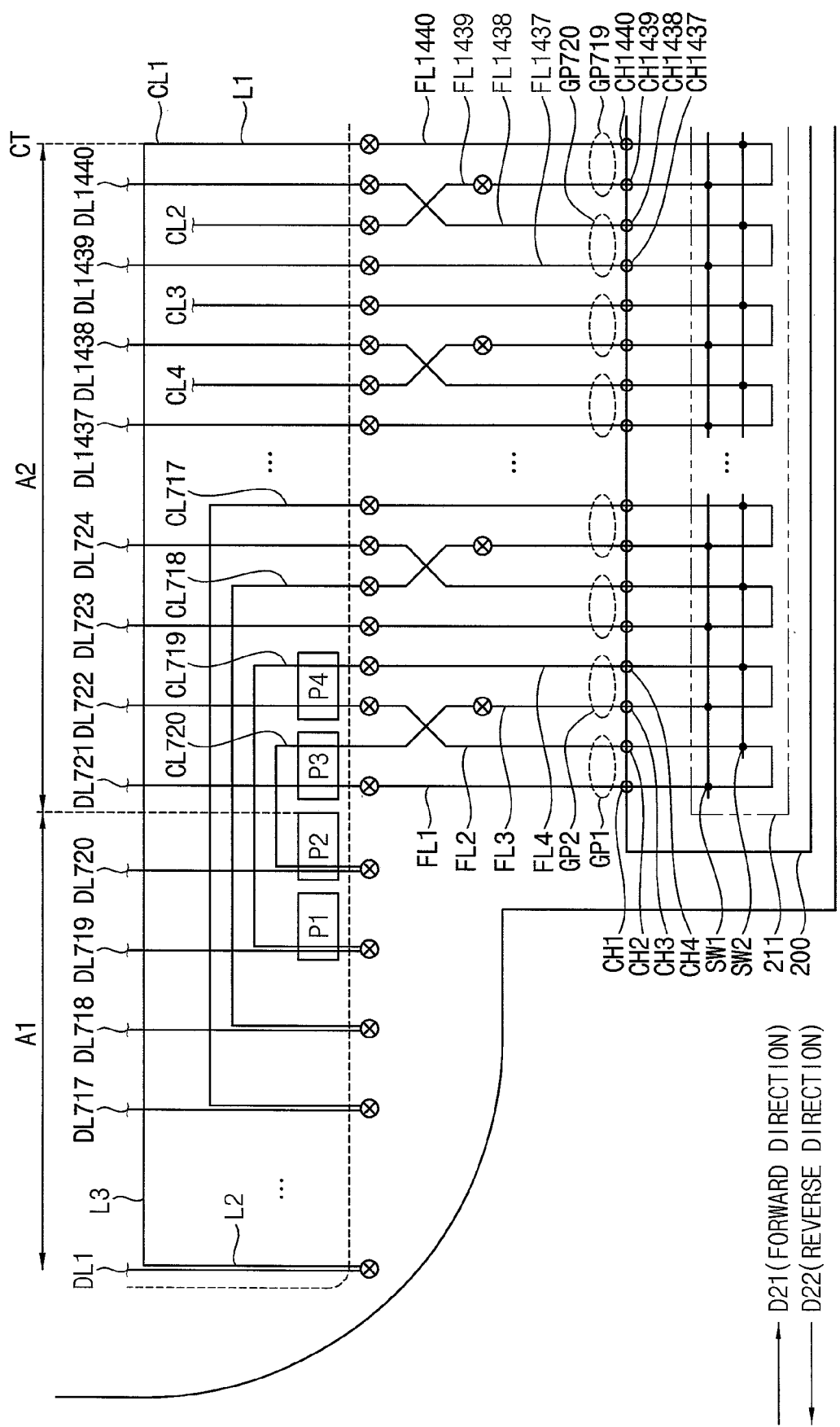
FIG. 4 is a plan diagram describing output channels of a driving circuit electrically connected to fan-out lines of a display device according to exemplary embodiments of the present disclosure.

FIG. 4 is a plan diagram describing output channels of a driving circuit electrically connected to fan-out lines of a display device according to exemplary embodiments of the present disclosure.

Referring to FIGS. 1 and 4, a structural relationship and an interconnection relationship between 1st to 1440-th data lines DL1 to DL1440 arranged in the first side area LA of the display portion DA, 1st to 720-th bypass lines CL1 to CL720, 1st to 1440-th fan-out lines FL1 to FL1440 arranged in the fan-out area FAO, and the 1st to 1440-th output channels CH1 to CH1440 of the data driving circuit 210 will be described.

The data driving circuit 210 may include a 2-demux 211 and a plurality of output channels CH1 to CH440.

The 2-demux 211 may output a data voltage for each output group formed by binding every two output lines. The 2-demux 211 may include a plurality of first switches SW1 and a plurality of second switches SW2.

The first switches SW1 may be electrically connected to, for example, the odd-numbered output channels CH1, CH3, . . . , CH1437 and CH1439 of the output channels CH1 to CH1440. The first switches SW1 may be turned on in response to a first turn-on control signal, and each of the odd-numbered output channels CH1, CH3, . . . , CH1437, and CH1439 may output a corresponding data voltage.

The second switches SW2 may be electrically connected to, for example, the even-numbered output channels CH2, CH4, . . . , CH1436, and CH1438 of the output channels CH1 to CH1440. The second switches SW2 may be turned on in response to a second turn-on control signal, and each of the even-numbered output channels CH2, CH4, . . . , CH1436, and CH1438 may output a corresponding data voltage.

The 2-demux 211 may output data voltages corresponding to one horizontal line to the output channels CH1 to CH1440 based on the first turn-on control signal and the second turn-on control signal obtained by dividing one horizontal section of a frame section into two sections.

The output channels CH1, CH2, . . . , CH1439, and CH1440 may be divided into a plurality of output groups GP1, GP2, GP3, . . . , GP719, and GP720 formed by binding every two output channels, according to a driving of the 2-demux 211.

The 1st to 1440-th fan-out lines FL1 to FL1440 may be electrically connected to the output channels CH1 to CH1440 in response to the driving of the 2-demux 211 of the data driving circuit 210.

The 1st fan-out line FL1 may electrically connect the first output channel CH1 to the 721st data line DL721.

The 2nd fan-out line FL2 may cross the 3rd fan-out line FL3 and may electrically connect the 2nd output channel CH2 to the 722nd data line DL722.

The 3rd fan-out line FL3 may cross the 2nd fan-out line FL2 and may electrically connect the 3rd output channel CH3 to the 720-th bypass line CL720 disposed between the 721st data line DL721 and the 722nd data line DL722.

The 4th fan-out line FL4 may electrically connect the 4th output channel CH4 to the 719th bypass line CL719 disposed between the 722nd data line DL722 and the 723rd data line DL723.

In addition, the 1437th fan-out line FL1437 may electrically connect the 1437th output channel CH1437 to the 1439th data line DL1439.

The 1438th fan-out line FL1438 may cross the 1439th fan-out line FL1439 and may electrically connect the 1438th output channel CH1438 to the 1440-th data line DL1440.

The 1439th fan-out line FL1439 may cross the 1438th fan-out line FL1438 and may electrically connect the 1439th output channel CH1439 to the 2nd bypass line CL2 disposed between the 1439th data line DL1439 and the 1440-th data line DL1440.

The 1440-th fan-out line FL1440 may electrically connect the 1440-th output channel CH1440 to the 1st bypass line CL1 disposed between the 1440-th data line DL1440 and the 1441st data line DL1441.

The first output group GP1 of the data driving circuit 210 may include the 1st and 2nd output channels CH1 and CH2, and the second output group GP2 of the data driving circuit 210 may include the 3rd and 4th output channels CH3 and CH4. In addition, the 719th output group GP719 of the data driving circuit 210 may include the 1437th and 1438 output channels CH1437 and CH1438, and the 720-th output group GP720 of the data driving circuit 210 may include the 1439th and 1440-th output channels CH1439 and CH1440.

Accordingly, the output groups GP1, GP2, GP3, . . . , GP719, and GP720 may include the odd-numbered output groups GP1, GP3, . . . , and GP719 and the even-numbered output groups GP2, GP4, . . . , and GP720.

The output channels CH1, CH2, . . . , CH1437, and CH1438 included in the odd-numbered output groups GP1, GP3, . . . , and GP719 may be sequentially electrically connected to the 721st to 1440-th data lines DL721 to DL1440 arranged in the second area A2.

The output channels CH1, CH2, . . . , CH1437, and CH1438 included in the odd-numbered output groups GP1, GP3, . . . , and GP719 may output the data voltages according to an arrangement sequence of the 721st to 1440-th data lines DL721 to DL1440 arranged in the second area A2.

The output channels CH3, CH4, . . . , CH1439, and CH1440 included in the even-numbered output groups GP2, GP4, . . . , and GP720 may be electrically connected, according to a reverse arrangement sequence, to the 1st to 720-th data lines DL1 to DL720 arranged in the first area A1 through the 1st to 720-th bypass lines CL1 to CL720.

The output channels CH3, CH4, . . . , CH1439, and CH1440 included in the even-numbered output groups GP2, . . . , and GP720 may output the data voltages according to a reverse arrangement sequence of the 1st to 720-th data lines DL1 to DL720 arranged in the first area A1.

For example, a first pixel P1 electrically connected to the 719th data line DL719 and a second pixel P2 electrically connected to the 720-th data line DL720 may be arranged in the first area A1, and a third pixel P3 electrically connected to the 721st data line DL721 and a fourth pixel P4 electrically connected to the 722nd data line DL722 may be arranged in the second area A2.

According to the driving of the 2-demux 211, the first switches SW1 may be turned on in a first section of one horizontal section, and the second switches SW2 may be turned on in a second section of the one horizontal section.

During the first section, the 1st output channel CH1 of the first output group GP1 may output a data voltage corresponding to the third pixel P3 of the second area A2, and the third output channel CH3 of the second output group GP2 may output a data voltage corresponding to the second pixel P2 of the first area A1.

During the second section, the 2nd output channel CH2 of the first output group GP1 may output a data voltage corresponding to the fourth pixel P4 of the second area A2, and the 4th output channel CH4 of the second output group GP2 may output a data voltage corresponding to the first pixel P1 of the first area A1.

As described above, the data driving circuit including the 2-demux may include a plurality of output groups formed by binding every two output channels, and a plurality of fan-out lines electrically connected to the output groups of the data driving circuit may have a structure in which (4N−3)th, (4N−2)th, (4N−1)th, and (4N)th fan-out lines cross each other (here, N is a positive integer).

Odd (or even)-numbered output groups of the output groups may be directly electrically connected to the data lines, and the even (or odd)-numbered output groups of the output channels may be electrically connected to the data lines through the bypass lines. The odd (or even)-numbered output groups of the data driving circuit may output the data voltages according to an arrangement sequence of the data lines arranged in the second area, and the even (or odd)-numbered output groups of the data driving circuit may output the data voltages according to a reverse arrangement sequence of the data lines arranged in the first area.

Accordingly, a sequence of data voltages outputted from a plurality of output channels of the data driving circuit may be changed, and thus an arrangement of the fan-out lines may be simplified. As a result, the non-display area (or referred to as a dead space) of the display device can be reduced, and the line resistance can be reduced.

Figure 5:
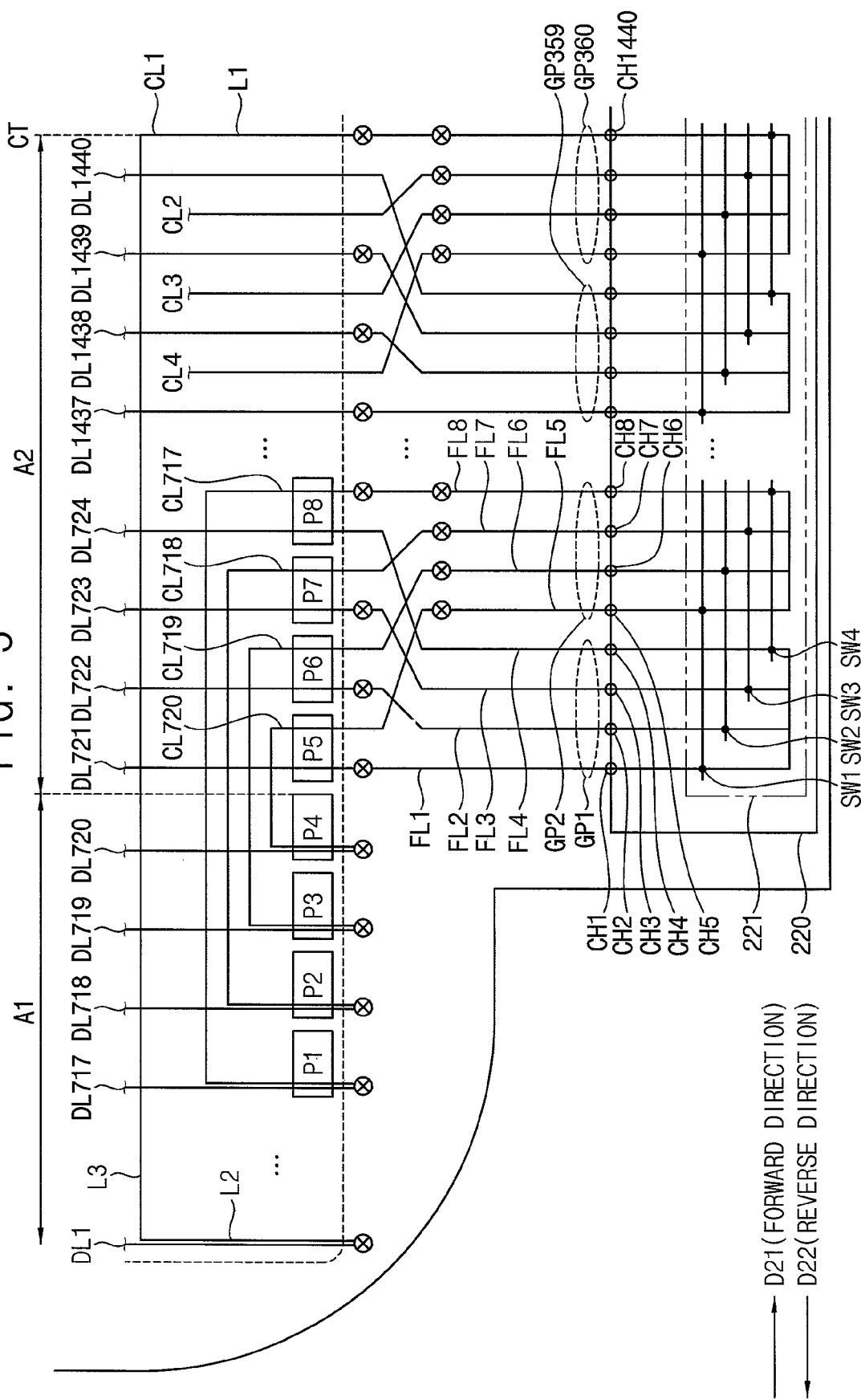
FIG. 5 is a plan diagram describing output channels of a driving circuit electrically connected to fan-out lines of a display device according to exemplary embodiments of the present disclosure.

FIG. 5 is a plan diagram describing output channels of a driving circuit electrically connected to fan-out lines of a display device according to exemplary embodiments of the present disclosure.

Referring to FIGS. 1 and 5, a structural relationship and an interconnection relationship between 1st to 1440-th data lines DL1 to DL1440 arranged in the first side area LA of the display portion DA, 1st to 720th bypass lines CL1 to CL720, 1st to 1440-th fan-out lines FL1 to FL1440 arranged in the fan-out area FAO, and the 1st to 1440-th output channels CH1 to CH1440 of the data driving circuit 220 will be described.

The data driving circuit 220 may include a 4-demux 221 and a plurality of output channels CH1 to CH1440.

The 4-demux 221 may output a data voltage for each output group formed by binding four output lines.

The 4-demux 221 may include a plurality of first switches SW1, a plurality of second switches SW2, a plurality of third switches SW3, and a plurality of fourth switches SW4.

The first switches SW1 may be electrically connected to, for example, (4N−3)th output channels CH1, CH5, . . . , and CH1437 of the output channels CH1 to CH1440 (here, N is a positive integer). The first switches SW1 may be turned on in response to a first turn-on control signal, and each of the (4N−3)th output channels CH1, CH5, . . . , and CH1437 may output a corresponding data voltage.

The second switches SW2 may be electrically connected to, for example, (4N−2)th output channels CH2, CH6, . . . , and CH1438 of the output channels CH1 to CH1440. The second switches SW2 may be turned on in response to a second turn-on control signal, and each of the (4N−2)th output channels CH2, CH6, . . . , and CH1438 may output a corresponding data voltage.

The third switches SW3 may be electrically connected to, for example, (4N−1)th output channels CH3, CH7, . . . , and CH1439 of the output channels CH1 to CH1440. The third switches SW3 may be turned on in response to a third turn-on control signal, and each of the (4N−1)th output channels CH3, CH7, . . . , and CH1439 may output a corresponding data voltage.

The fourth switches SW4 may be electrically connected to, for example, (4N)th output channels CH4, CH8, . . . , and CH1440 of the output channels CH1 to CH1440. The fourth switches SW4 may be turned on in response to a fourth turn-on control signal, and each of the (4N)th output channels CH4, CH8, . . . , and CH1440 may output a corresponding data voltage.

The 4-demux 221 may output data voltages corresponding to one horizontal line to the output channels CH1 to CH1440 based on the first turn-on control signal, the second turn-on control signal, the third turn-on control signal, and the fourth turn-on control signal that are obtained by dividing one horizontal section of a frame section into four sections.

The output channels CH1, CH2, . . . , CH1439, and 1440 may be divided into a plurality of output groups GP1, GP2, . . . , GP359, and GP360 formed by binding every four output channels, according to a driving of the 4-demux 221.

The 1st to 1440-th fan-out lines FL1 to FL1440 may be electrically connected to the output channels CH1 to CH1440 in response to the driving of the 4-demux 221 of the data driving circuit 220.

The 1st fan-out line FL1 may electrically connect the first output channel CH1 to the 721st data line DL721.

The 2nd fan-out line FL2 may cross the 5th fan-out line FL5 and may electrically connect the 2nd output channel CH2 to the 722nd data line DL722.

The 3rd fan-out line FL3 may cross the 5th fan-out line FL5 and the 6th fan-out line FL6 and may electrically connect the 3rd output channel CH3 to the 723rd data line DL723.

The 4th fan-out line FL4 may cross the 5th fan-out line FL5, the 6th fan-out line FL6, and the 7th fan-out line FL7 and may electrically connect the 4th output channel CH4 to the 724th data line DL724.

The 5th fan-out line FL5 may electrically connect the 5th output channel CH5 to the 720-th bypass line CL720 disposed between the 721st data line DL721 and the 722nd data line DL722.

The 6th fan-out line FL6 may electrically connect the 5th output channel CH5 to the 719th bypass line CL719 disposed between the 722nd data line DL722 and the 723rd data line DL723.

The 7th fan-out line FL7 may electrically connect the 7th output channel CH7 to the 718th bypass line CL718 disposed between the 723rd data line DL723 and the 724th data line DL724.

The 8th fan-out line FL8 may electrically connect the 8th output channel CH8 to the 717th bypass line CL717 disposed between the 724th data line DL724 and the 725th data line DL725.

The first output group GP1 of the data driving circuit 220 may include the 1st, 2nd, 3rd, and 4th output channels CH1, CH2, CH3, and CH4, and the second output group GP2 of the data driving circuit 220 may include the 5th, 6th, 7th, and 8th output channels CH5, CH6, CH7, and CH8.

Accordingly, the output groups GP1, GP2, GP3, . . . , and GP360 may include the odd-numbered output groups GP1, GP3, . . . , and GP359 and the even-numbered output groups GP2, GP4, . . . , and GP360.

The output channels CH1, CH2, CH3, CH4, . . . included in the odd-numbered output groups GP1, GP3, . . . , and GP359 may be sequentially electrically connected to the 721st to 1440-th data lines DL721 to DL1440 arranged in the second area A2.

The output channels CH1, CH2, CH3, CH4, . . . included in the odd-numbered output groups GP1, GP3, . . . , and GP359 may output the data voltages according to an arrangement sequence of the 721st to 1440-th data lines DL721 to DL1440 arranged in the second area A2.

The output channels CH5, CH6, CH7, CH8, . . . included in the even-numbered output groups GP2, GP4, . . . , and GP360 may be electrically connected, according to a reverse arrangement sequence, to the 1st to 720-th data lines DL1 to DL720 arranged in the first area A1 through the 1 st to 720-th bypass lines CL1 to CL720.

The output channels CH5, CH6, CH7, CH8, . . . included in the even-numbered output groups GP2, . . . , and GP360 may output the data voltages according to a reverse arrangement sequence of the 1st to 720-th data lines DL1 to DL720 arranged in the first area A1.

For example, in the first area A1, a first pixel P1 electrically connected to the 717th data line DL717, a second pixel P2 electrically connected to the 718th data line DL718, a third pixel P3 electrically connected to the 719th data line DL719, and a fourth pixel P4 electrically connected to the 720-th data line DL720 may be arranged. In the second area A2, a fifth pixel P5 electrically connected to the 721st data line DL721, a sixth pixel P6 electrically connected to the 722nd data line DL722, a seventh pixel P7 electrically connected to the 723rd data line DL723, and an eighth pixel P8 electrically connected to the 724th data line DL724 may be arranged.

According to the driving of the 4-demux 221, the first switches SW1 may be turned on in a first section of one horizontal section, the second switches SW2 may be turned on in a second section of the one horizontal section, the third switches SW3 may be turned on in a third section of the one horizontal section, and the fourth switches SW4 may be turned on in a fourth section of the one horizontal section.

During the first section, the 1st output channel CH1 of the first output group GP1 may output a data voltage corresponding to the fifth pixel P5 of the second area A2, and the fifth output channel CH5 of the second output group GP2 may output a data voltage corresponding to the fourth pixel P4 of the first area A1.

During the second section, the 2nd output channel CH2 of the first output group GP1 may output a data voltage corresponding to the sixth pixel P6 of the second area A2, and the 6th output channel CH6 of the second output group GP2 may output a data voltage corresponding to the third pixel P3 of the first area A1.

During the third section, the 3rd output channel CH3 of the first output group GP1 may output a data voltage corresponding to the seventh pixel P7 of the second area A2, and the 7th output channel CH7 of the second output group GP2 may output a data voltage corresponding to the second pixel P2 of the first area A1.

During the fourth section, the 4th output channel CH4 of the first output group GP1 may output a data voltage corresponding to the eighth pixel P8 of the second area A2, and the 8th output channel CH8 of the second output group GP2 may output a data voltage corresponding to the first pixel P1 of the first area A1.

As described above, the data driving circuit including the 4-demux may include a plurality of output groups formed by binding every four output channels, and a plurality of fan-out lines electrically connected to the output groups of the data driving circuit may have a structure in which (8N−7)th, (8N−6)th, (8N−5)th, (8N−4)th, (8N−3)th (8N−2)th, (8N−1)th, and (8N)th fan-out lines cross each other (here, N is a positive integer).

Odd (or even)-numbered output groups of the output groups may be directly electrically connected to the data lines, and the even (or odd)-numbered output groups of the output channels may be electrically connected to the data lines through the bypass lines. The odd (or even)-numbered output groups of the data driving circuit may output the data voltages according to an arrangement sequence of the data lines arranged in the second area, and the even (or odd)- numbered output groups of the data driving circuit may output the data voltages according to a reverse arrangement sequence of the data lines arranged in the first area.

Accordingly, a sequence of data voltages outputted from a plurality of output channels of the data driving circuit may be changed, and thus an arrangement of the fan-out lines may be simplified. As a result, the non-display area (which may be referred to as a dead space) of the display device can be reduced, and the line resistance can be reduced.

Figure 6:
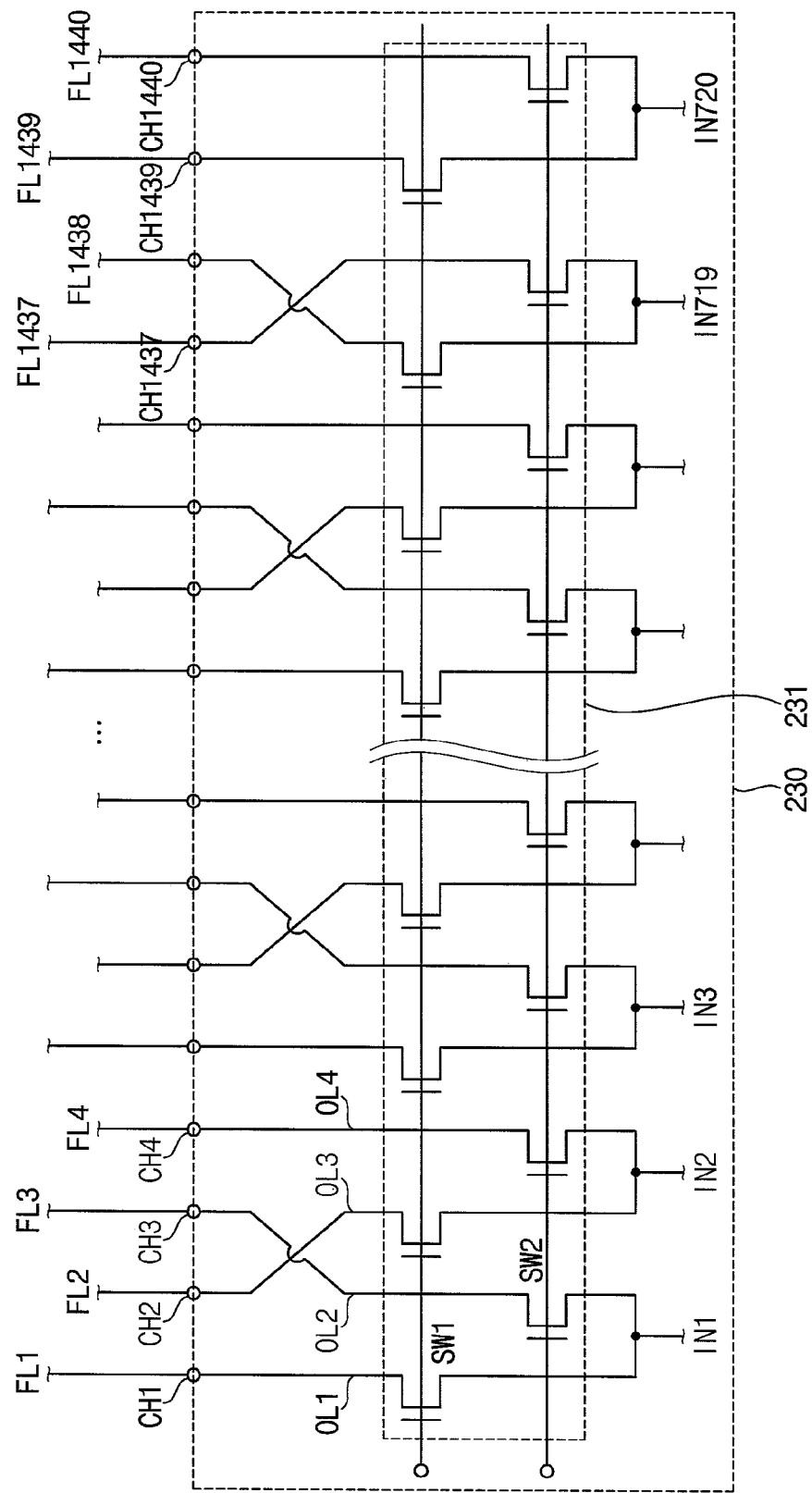
FIG. 6 is a conceptual diagram describing output channels of a driving circuit electrically connected to fan-out lines according to exemplary embodiments of the present disclosure.

FIG. 6 is a conceptual diagram describing output channels of a driving circuit electrically connected to fan-out lines according to exemplary embodiments of the present disclosure.

Referring to FIG. 6, the data driving circuit 230 may include a 2-demux 231 and a plurality of output channels CH1 to CH1440.

The 2-demux 231 may output a data voltage for each output group formed by binding every two output lines. The 2-demux 231 may include a plurality of input terminals IN1, IN2, . . . , and IN720, a plurality of first switches SW1, a plurality of second switches SW2, and a plurality of output lines OL1, OL2, . . . , OL1439, and OL1440.

The first switches SW1 may electrically connect the input terminals IN1, IN2, . . . , and IN720 to, for example, the odd-numbered output lines OL1, OL3, . . . , OL1437, and OL1439 among the output lines OL1, OL2, . . . , OL1439, and OL1440.

The first switches SW1 may be turned on in response to a first turn-on control signal and may output data voltages corresponding to the odd-numbered output lines OL1, OL3, . . . , OL1437, and OL1439.

The second switches SW2 may electrically connect the input terminals IN1, IN2, . . . , and IN720 to, for example, the even-numbered output lines OL2, OL4, . . . , OL1438, and OL1440 among the output lines OL1, OL2, . . . , OL1439, and OL1440. The second switches SW2 may be turned on in response to a second turn-on control signal and may output data voltages corresponding to the even-numbered output lines OL2, OL2, . . . , OL1438, and OL1440.

The output lines OL1, OL2, . . . , OL1439, and OL1440 of the 2-demux 231 may be electrically connected to the output channels CH1 to CH1440 of the data driving circuit 230.

The 1st output line OL1 may be electrically connected to the 1st output channel CH1, and the 2nd output line OL2 may cross the 3rd output line OL3 and is electrically connected to the 3rd output channel CH3.

The 3rd output line OL3 may cross the 2nd output line OL2 and may be electrically connected to the 2nd output channel CH2. The 4th output line OL4 may be electrically connected to the 4th output channel CH4.

The output channels CH1 to CH1440 of the data driving circuit 230 may be electrically connected to the 1st to 1440-th fan-out lines FL1 to FL1440.

Referring to FIG. 2, odd-numbered fan-out lines FL1, FL3, . . . , and FL1439 of the 1st to 1440-th fan-out lines FL1 to FL1440 may be sequentially electrically connected to 721st to 1440-th data lines DL721 to DL1440 arranged in the second area A2. Even-numbered fan-out lines FL2, FL4, . . . , and FL1440 of the 1st to 1440-th fan-out lines FL1 to FL1440 may be electrically connected, according to a reverse arrangement sequence, to the 1st to 720-th data lines DL1 to DL720 arranged in the first area A1 through the 1st to 720-th bypass lines CL1 to CL720.

According to the driving of the 2-demux 231, the first switches SW1 may be turned on in a first section of one horizontal section, and the second switches SW2 may be turned on in a second section of the one horizontal section.

During the first section, the 1st output line OL1 and the 3rd output line OL3 of the 2-demux 231 electrically connected to the first switches SW1 may output data voltages. The 1st output channel CH1 electrically connected to the 1st output line OL1 and the 2nd output channel CH2 electrically connected to the 3rd output line OL3 may output the data voltages.

Referring to FIG. 2, the 1st output channel CH1 may output a data voltage corresponding to the fifth pixel P5 of the second area A2, and the 2nd output channel CH2 may output a data voltage corresponding to the fourth pixel P4 of the first area A1.

During the second section, the 2nd output line OL2 and the 4th output line OL4 of the 2-demux 231 electrically connected to the second switches SW2 may output data voltages. The 3rd output channel CH3 electrically connected to the 2nd output line OL2 and the 4th output channel CH4 electrically connected to the 4th output line OL4 may output the data voltages.

Referring to FIG. 2, the 3rd output channel CH3 may output a data voltage corresponding to the sixth pixel P6 of the second area A2, and the 4th output channel CH4 may output a data voltage corresponding to the third pixel P3 of the first area A1.

As described above, the data driving circuit including the 2-demux may electrically connect the (4N−3)th, (4N−2)th, (4N−1)th, and (4N)th output lines to a plurality of output channels of the data driving circuit after crossing the output lines to each other. Accordingly, the odd (or even)-numbered output channels among the output channels of the data driving circuit may be directly electrically connected to the data lines, and the even (or odd)-numbered output channels of the output channels may be electrically connected to the data lines through the bypass lines. The odd (or even)-numbered output channels of the data driving circuit may output data voltages according to an arrangement sequence of the data lines arranged in the second area, and the even (or odd)-numbered output channels of the data driving circuit may output data voltages according to a reverse arrangement sequence of the data lines arranged in the first area.

Accordingly, a sequence of data voltages outputted from a plurality of output channels of the data driving circuit may be changed, and thus an arrangement of the fan-out lines may be simplified. As a result, the non-display area of the display device can be reduced, and the line resistance can be reduced.

Figure 7:
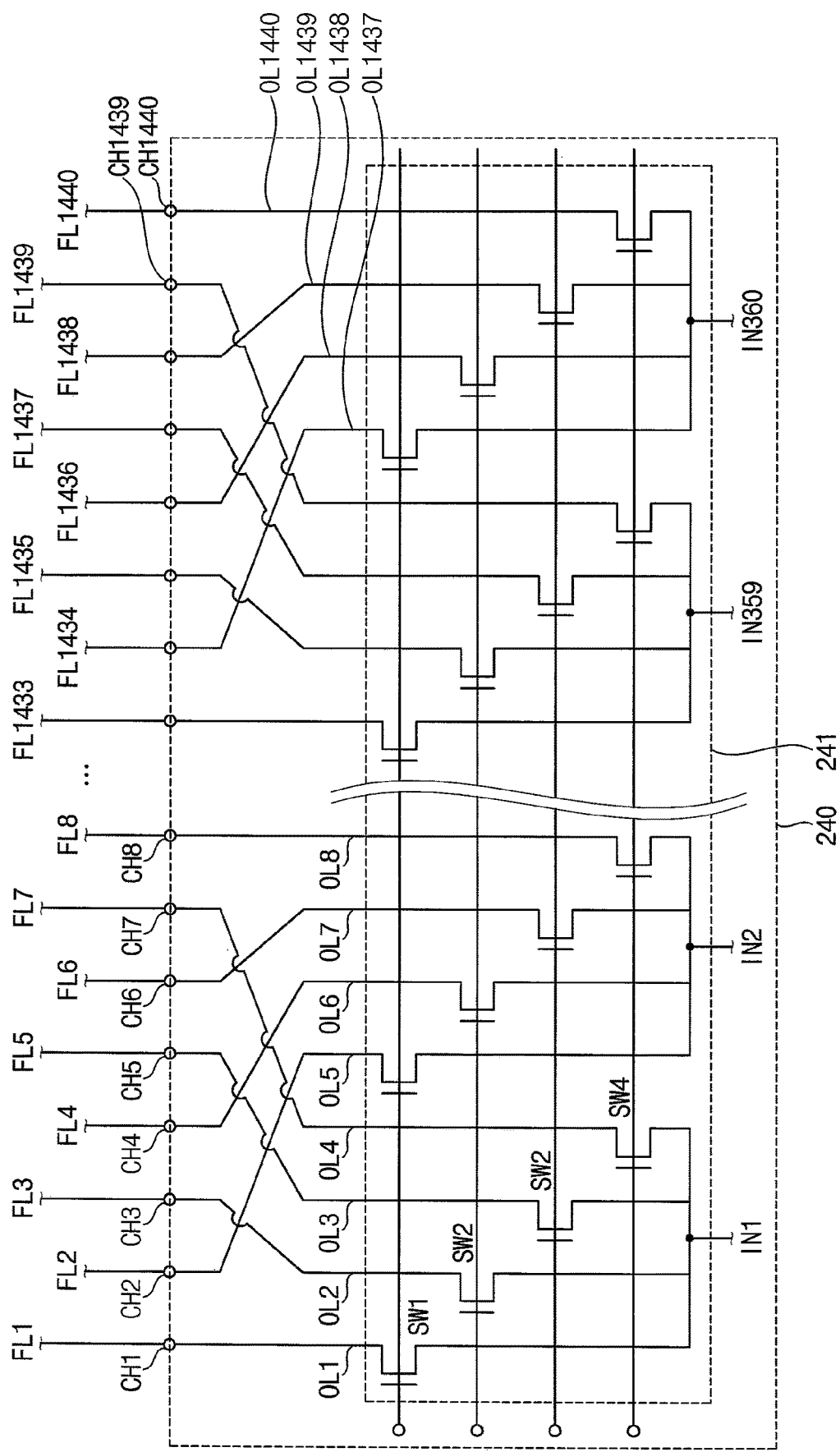
FIG. 7 is a conceptual diagram describing output channels of a driving circuit electrically connected to fan-out lines according to exemplary embodiments of the present disclosure.

FIG. 7 is a conceptual diagram describing output channels of a driving circuit electrically connected to fan-out lines according to exemplary embodiments of the present disclosure.

Referring to FIG. 7, the data driving circuit 240 may include a 4-demux 241 and a plurality of output channels CH1 to CH1440.

The 4-demux 241 may output a data voltage for each output group formed by binding four output lines.

The 4-demux 241 may include a plurality of input terminals IN1, IN2, . . . , and IN360, a plurality of first switches SW1, a plurality of second switches SW2, a plurality of third switches SW3, a plurality of fourth switches SW4, and a plurality of output lines OL1, OL2, . . . , OL1439, and OL1440.

The first switches SW1 may electrically connect the input terminals IN1, IN2, . . . , and IN360 to, for example, (4N−3)th output lines OL1, OL5, . . . , and OL1437 among the output lines OL1, OL2, . . . , OL1439, and OL1440.

The second switches SW2 may electrically connect the input terminals IN1, IN2, . . . , and IN360 to, for example, (4N−2)th output lines OL2, OL6, . . . , and OL1438 among the output lines OL1, OL2, . . . , OL1439, and OL1440.

The third switches SW3 may electrically connect the input terminals IN1, IN2, . . . , and IN360 to, for example, (4N−1)th output lines OL3, OL7, . . . , and OL1439 among the output lines OL1, OL2, . . . , OL1439, and OL1440.

The fourth switches SW4 may electrically connect the input terminals IN1, IN2, . . . , and IN360 to, for example, (4N)th output lines OL4, OL8, . . . , and OL1440 among the output lines OL1, OL2, . . . , OL1439, and OL1440.

The output lines OL1, OL2, . . . , OL1439, and OL1440 of the 4-demux 241 may be electrically connected to the output channels CH1 to CH1440 of the data driving circuit 230.

The 1 st output line OL1 may be electrically connected to the 1 st output channel CH1.

The 2nd output line OL2 may cross the 5th output line OL5 and may be electrically connected to the 2nd output channel CH2. The 3rd output line OL3 may cross the 5th output line OL5 and the sixth output line OL6 and may be electrically connected to the 3rd output channel CH3. The 4th output line OL4 may cross the 5th output line OL5, the sixth output line OL6, and the 7th output line OL7 and may be electrically connected to the 4th output channel CH4.

The 5th output line OL5 may cross the 2nd, 3rd and 4th output lines OL2, OL3 and OL4 and may be electrically connected to the 2nd output channel CH2. The 6th output line OL6 may cross the 3rd and 4th output lines OL3 and OL4 and may be electrically connected to the 4th output channel CH4. The 7th output line OL7 may cross the 4th output line OL4 and may be electrically connected to the 6th output channel CH6. The 8th output line OL8 may be electrically connected to the 8th output channel CH8.

The output channels CH1 to CH1440 of the data driving circuit 230 may be electrically connected to the 1st to 1440-th fan-out lines FL1 to FL1440.

Referring to FIG. 2, odd-numbered fan-out lines FL1, FL3, . . . , and FL1439 of the 1st to 1440-th fan-out lines FL1 to FL1440 may be sequentially electrically connected to 721st to 1440-th data lines DL721 to DL1440 arranged in the second area A2. Even-numbered fan-out lines FL2, FL4, . . . , and FL1440 of the 1st to 1440-th fan-out lines FL1 to FL1440 may be electrically connected, according to a reverse arrangement sequence, to the 1st to 720-th data lines DL1 to DL720 arranged in the first area A1 through the 1st to 720-th bypass lines CL1 to CL720.

According to the driving of the 4-demux 241, the first switches SW1 may be turned on in a first section of one horizontal section, the second switches SW2 may be turned on in a second section of the one horizontal section, the third switches SW3 may be turned on in a third section of the one horizontal section, and the fourth switches SW4 may be turned on in a fourth section of the one horizontal section.

During the first section, the 1st output line OL1 and the 5th output line OL5 of the 4-demux 241 electrically connected to the first switches SW1 may output data voltages. The 1st output channel CH1 electrically connected to the 1st output line OL1 and the 2nd output channel CH2 electrically connected to the 5th output line OL5 may output the data voltages.

Referring to FIG. 2, the 1st output channel CH1 may output a data voltage corresponding to the fifth pixel P5 of the second area A2, and the 2nd output channel CH2 may output a data voltage corresponding to the fourth pixel P4 of the first area A1.

During the second section, the 2nd output line OL2 and the 6th output line OL6 of the 4-demux 241 electrically connected to the second switches SW2 may output data voltages. The 3rd output channel CH3 electrically connected to the 2nd output line OL2 and the 4th output channel CH4 electrically connected to the 6th output line OL6 may output the data voltages.

Referring to FIG. 2, the 3rd output channel CH3 may output a data voltage corresponding to the sixth pixel P6 of the second area A2, and the 4th output channel CH4 may output a data voltage corresponding to the third pixel P3 of the first area A1.

During the third section, the 3rd output line OL3 and the 7th output line OL7 of the 4-demux 241 electrically connected to the third switches SW3 may output data voltages. The 5th output channel CH5 electrically connected to the 3rd output line OL3 and the 6th output channel CH6 electrically connected to the 7th output line OL7 may output the data voltages.

Referring to FIG. 2, the 5th output channel CH5 may output a data voltage corresponding to the seventh pixel P7 of the second area A2, and the 6th output channel CH6 may output a data voltage corresponding to the second pixel P2 of the first area A1.

During the fourth section, the 4th output line OL4 and the 8th output line OL5 of the 4-demux 241 electrically connected to the fourth switches SW4 may output data voltages. The 7th output channel CH7 electrically connected to the 4th output line OL4 and the 8th output channel CH8 electrically connected to the 8th output line OL8 may output the data voltages.

Referring to FIG. 2, the 7th output channel CH7 may output a data voltage corresponding to the eighth pixel P8 of the second area A2, and the 8th output channel CH8 may output a data voltage corresponding to the first pixel P1 of the first area A1.

As described above, the data driving circuit including the 4-demux may electrically connect the (8N−7)th, (8N−6)th, (8N−5)th, (8N−4)th, (8N−3)th, (8N−2)th, (8N−1)th, and (8N)th output lines to a plurality of output channels of the data driving circuit after crossing the output lines to each other.

Accordingly, the odd (or even)-numbered output channels among the output channels of the data driving circuit may be directly electrically connected to the data lines, and the even (or odd)-numbered output channels of the output channels may be electrically connected to the data lines through the bypass lines. The odd (or even)-numbered output channels of the data driving circuit may output data voltages according to an arrangement sequence of the data lines arranged in the second area, and the even (or odd)-numbered output channels of the data driving circuit may output data voltages according to a reverse arrangement sequence of the data lines arranged in the first area.

Accordingly, a sequence of data voltages outputted from a plurality of output channels of the data driving circuit may be changed, and thus an arrangement of the fan-out lines may be simplified. As a result, the non-display area of the display device can be reduced, and the line resistance can be reduced.

Hereinafter, the same components as in the previous embodiment will be described with reference to the same reference numerals, and duplicated descriptions will not be repeated.

Figure 8:
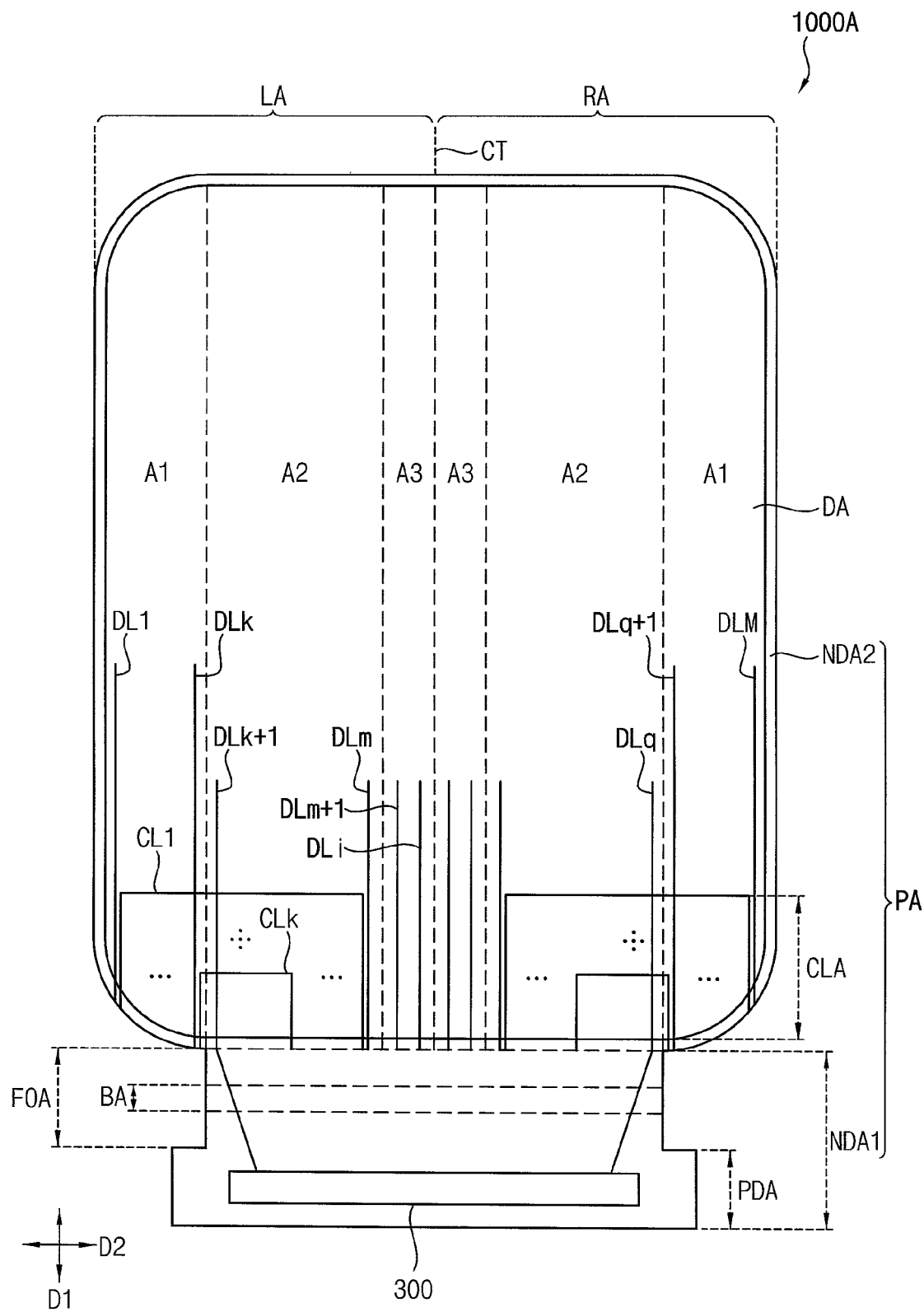
FIG. 8 is a plan diagram illustrating a display device according to exemplary embodiments of the present disclosure.

FIG. 8 is a plan diagram illustrating a display device according to exemplary embodiments of the present disclosure.

Referring to FIG. 8, the display device 1000A may include a display portion DA on which an image is displayed and a peripheral portion PA adjacent to the display portion DA and at least partially surrounding the display portion DA.

The display portion DA may have a substantially rectangular shape having rounded edges defined in a first direction D1 and a second direction D2 that is perpendicular to the first direction D1 when viewed in a plan view.

The display portion DA may include a first side area LA and a second side area RA that are laterally symmetrical about a center line CT extending primarily in the first direction D1.

Each of the first and second side areas LA and RA may include a first area A1, a second area A2, and a third area A3. The first area A1 refers to an area corresponding to a rounded edge part of the display portion DA, the second area A2 refers to an area corresponding to a first straight edge portion adjacent to the first area A1 that is the rounded edge part, and the third area A3 refers to an area corresponding to a second straight edge part adjacent to the first straight edge part.

In the first side area LA, 1st to i-th data lines DL1 to DLi may be arranged, where i is a positive integer.

In addition, 1st to k-th data lines DL1 to DLk may be arranged in a first area A1 of the first side area LA, (k+1)th to m-th data lines DLk+1 to DLm may be arranged in a second area A2 of the first side area LA, and (m+1)th to i-th data lines DLm+1 to DLi may be arranged in a third area A3 of the first side area LA, where k, m and i are positive integers (k<m<i).

The display portion DA may include a bypass line area CLA in which a plurality of bypass lines CL1 to CLk are arranged. In addition, 1st to k-th bypass lines CL1 to CLk may be arranged in the first and second areas A1 and A2 of the first side area LA.

Each of the 1st to k-th bypass lines CL1 to CLk may include a first straight portion electrically connected to an end of a fan-out line arranged in a fan-out area, a crossing portion crossing with the data lines arranged in the first and second areas A1 and A2, and a second straight portion electrically connected to an end of the data line arranged in the first area A1.

For example, the 1st to k-th bypass lines CL1 to CLk may be electrically connected to the 1st to k-th data lines DL1 to DLk arranged in the first area A1.

The 1st to k-th bypass lines CL1 to CLk might not be arranged in the third area A3, but only the (m+1)th to i-th data lines DLm+1 to DLi may be arranged in the third area A3.

The second side area RA may include first, second and third areas A1, A2, and A3 that are symmetrical with the first side area LA, and a plurality of data lines and a plurality of bypass lines, which are symmetrical with the data lines and the bypass lines arranged in the first side area LA, may be arranged in the second side area RA.

The peripheral portion PA may include a first non-display area NDA1 and a second non-display area NDA2.

The first non-display area NDA1 may be an area extending primarily in the first direction D1 from the straight edge part corresponding to the second and third areas A2 and A3 of the display portion DA. The first non-display area NDA1 might not be present in the rounded edge part corresponding to the first areas A1 of the display portion DA.

The first non-display area NDA1 may include a pad area PDA and a fan-out area FOA. The fan-out area FAO may include a bending area BA.

FIG. 9 is a plan diagram describing output channels of a driving circuit electrically connected to fan-out lines shown in FIG. 8.

In an exemplary embodiments of the present disclosure, the display device may include 1st to 2880-th data lines, and the data driving circuit 300 may include 1st to 2880-th output channels configured to output data voltages corresponding to the 1st to 2880-th data lines.

Referring to FIGS. 8 and 9, the first side area LA and the second side area RA of the display portion DA may be laterally symmetrical with respect to the center line CT of the display portion DA (e.g. mirror symmetry).

Hereinafter, a structural relationship and an interconnection relationship between 1st to 1440-th data lines DL1 to DL1440 arranged in the first side area LA of the display portion DA, 1st to 680-th bypass lines CL1 to CL680, 1st to 1440-th fan-out lines FL1 to FL1440 arranged in the fan-out area FAO, and the 1st to 1440-th output channels CH1 to CH1440 of the data driving circuit 300 will be described.

The 1st to 1440-th data lines DL1 to DL440 may be sequentially arranged along a first side direction (e.g., a forward direction D21) of the second direction D2.

The 1st to 680-th data lines DL to DL680 may be sequentially arranged along the forward direction D21 in the first area A1, the 681st to 1360-th data lines DL681 to DL1360 may be sequentially arranged along the forward direction D21 in the second area A2, and the 1361st to 1440-th data lines DL1361 to DL1440 may be sequentially arranged along the forward direction D21 in the third area A3.

The 1st to 1440-th fan-out lines FL1 to FL1440 may be sequentially arranged along the forward direction D21.

Odd-numbered fan-out lines FL1, FL3, . . . , and FL1359 among 1st to 1360-th fan-out lines FL1 to FL1360 corresponding to the 1st to 1360-th data lines DL1 to DL1360 arranged in the first and second areas A1 and A2 may be sequentially electrically connected to the 681st to 1360-th data lines DL681 to DL1360 arranged in the second area A2. Even-numbered fan-out lines FL2, FL4, . . . , and FL1360 of the 1st to 1360-th fan-out lines FL1 to FL1360 may be electrically connected, according to a reverse arrangement sequence, to the 1st to 680-th data lines DL1 to DL680 arranged in the first area A1 through the 1st to 680-th bypass lines CL1 to CL680.

First straight portions of the 1 st to 680-th bypass lines CL1 to CL680 may be alternately arranged between the 681st to 1360-th data lines DL681 to DL1360 arranged in the second area A2.

For example, a first straight portion L1 of the first bypass line CL1 may be electrically connected to an end of the 1360-th fan-out line FL1360, and a second straight portion L2 of the 1st bypass line CL1 may be electrically connected to an end of the 1st data line DL1.

A first straight portion L1 of the 680-th bypass line CL680 may be electrically connected to an end of the 2nd fan-out line FL2, and a second straight portion L2 of the 680-th bypass line CL680 may be electrically connected to an end of the 680-th data line DL680.

The data driving circuit 300 may include a plurality of output channels CH1 to CH1440.

The 1st to 1440-th output channels CH1 to CH1440 may be arranged along the forward direction D21 and may be electrically connected to the fan-out lines FL1 to FL1440 arranged in the forward direction D21.

Odd-numbered output channels CH1, CH3, . . . , and CH1359 among the 1st to 1360-th output channels CH1 to CH1440 may output data voltages according to an arrangement sequence of the 681st to 1360-th data lines DL681 to DL1360 arranged in the second area A2.

Even-numbered output channels CH2, CH4, . . . , and CH1360 among the 1st to 1360-th output channels CH1 to CH1360 may output data voltages according to a reverse arrangement sequence of the 1st to 680-th data lines DL1 to DL680 arranged in the first area A1.

The 1361st to 1440-th output channels CH1361 to CH1440 may output data voltages according to an arrangement sequence of the 1361st to 1440-th data lines DL1361 to DL1440 arranged in the third area A3.

Odd (or even)-numbered first output channels among the output channels of the data driving circuit may be directly electrically connected to the data lines, even (or odd)-numbered first output channels of the first output channels may be electrically connected to the data lines through the bypass lines, and second output channels among the output channels may be directly electrically connected to the data lines. The odd (or even)-numbered first output channels may output data voltages according to an arrangement sequence of the data lines arranged in the second area, the even (or odd)-numbered first output channels may output data voltages according to a reverse arrangement sequence of the data lines arranged in the first area, and the second output channels may output data voltages according to an arrangement sequence of the data lines arranged in the third area.

Accordingly, a sequence of data voltages outputted from a plurality of output channels of the data driving circuit may be changed, and thus an arrangement of the fan-out lines may be simplified. As a result, the non-display area of the display device can be reduced, and the line resistance can be reduced.

As shown in FIG. 4, the data driving circuit according to exemplary embodiments of the present disclosure may include a 2-demux.

In this case, as shown in FIG. 4, the 1st to 1360-th fan-out lines F1 to F1360 corresponding to the 1st to 1360-th data lines DL1 to DL1360 arranged in the first and second areas A1 and A2 may be electrically connected to the data lines and the bypass lines in which (4N−3)th, (4N−2)th, (4N−1)th, and (4N)th fan-out lines are alternately arranged while crossing each other (here, N is a positive integer). Meanwhile, as shown in FIG. 9, 1361st to 1440-th fan-out lines F1361 to F1440 corresponding to the 1361st to 1440-th data lines DL1361 to DL1440 arranged in the third area A3 may be directly electrically connected to, without crossing, the 1361st to 1440-th data lines DL1361 to DL1440 in the third area A3.

As shown in FIG. 5, the data driving circuit according to exemplary embodiments of the present disclosure may include the 4-demux.

In this case, as shown in FIG. 5, the 1st to 1360-th fan-out lines F1 to F1360 corresponding to the 1st to 1360-th data lines DL1 to DL1360 arranged in the first and second areas A1 and A2 may be electrically connected to the data lines and the bypass lines in which (8N−7)th, (8N−6)th, (8N−5)th, (8N−4)th, (8N−3)th, (8N−2)th, (8N−1)th, and (8N)th fan-out lines are alternately arranged while crossing each other (here, N is a positive integer). Meanwhile, as shown in FIG. 9, 1361st to 1440-th fan-out lines F1361 to F1440 corresponding to the 1361st to 1440-th data lines DL1361 to DL1440 arranged in the third area A3 may be directly electrically connected to, without crossing, the 1361st to 1440-th data lines DL1361 to DL1440 in the third area A3.

As shown in FIG. 6, the data driving circuit according to exemplary embodiments of the present disclosure may include a 2-demux in which the (4N−3)th, (4N−2)th, (4N−1)th, and (4N)th output lines cross each other (here, N is a positive integer).

In this case, as shown in FIG. 6, the 1st to 1360-th fan-out lines F1 to F1360 corresponding to the 1st to 1360-th data lines DL1 to DL1360 arranged in the first and second areas A1 and A2 may be directly electrically connected to, without crossing, the data lines and the bypass lines that are alternately arranged. In addition, as shown in FIG. 9, 1361st to 1440-th fan-out lines F1361 to F1440 corresponding to the 1361st to 1440-th data lines DL1361 to DL1440 arranged in the third area A3 may be directly electrically connected to, without crossing, the 1361st to 1440-th data lines DL1361 to DL1440 in the third area A3.

As shown in FIG. 7, the data driving circuit according to exemplary embodiments of the present disclosure may include a 4-demux in which the (8N−7)th, (8N−6)th, (8N−5)th, (8N−4)th, (8N−3)th, (8N−2)th, (8N−1)th, and (8N)th output lines cross each other.

In this case, as shown in FIG. 7, the 1st to 1360-th fan-out lines F1 to F1360 corresponding to the 1st to 1360-th data lines DL1 to DL1360 arranged in the first and second areas A1 and A2 may be directly electrically connected to, without crossing, the data lines and the bypass lines that are alternately arranged. In addition, as shown in FIG. 9, the 1361st to 1440-th fan-out lines F1361 to F1440 corresponding to the 1361st to 1440-th data lines DL1361 to DL1440 arranged in the third area A3 may be directly electrically connected to, without crossing, the 1361st to 1440-th data lines DL1361 to DL1440 in the third area A3.

As described above, a sequence of data voltages outputted from a plurality of output channels of the data driving circuit may be changed, and thus an arrangement of the fan-out lines may be simplified. As a result, the non-display area of the display device can be reduced, and the line resistance can be reduced.

The present invention may be applied to an organic light emitting display device and an electronic device including the organic light emitting display device. For example, the present invention may be applied to a cellular phone, a smart phone, a video phone, a smart pad, a smart watch, a tablet personal computer (PC), a car navigation system or infotainment console, a television, a computer monitor, a laptop PC, a head mounted display (HMD) device, etc.

The foregoing is illustrative of exemplary embodiments of the present disclosure and is not to be construed as limiting thereof. Although a few exemplary embodiments of the present disclosure have been described, those skilled in the art will readily appreciate that many modifications are possible to the disclosed structures and methods without materially departing from the present disclosure.

What is claimed is:

1. A display device, comprising:
a display portion having a substantially rectangular area with at least one rounded edge in which a plurality of data lines are disposed, the display portion including a first area corresponding to a rounded edge part and a second area corresponding to a straight edge part adjacent to the first area; and
a data driving circuit including a plurality of output channels configured to output data voltages, wherein odd-numbered output channels of the plurality of output channels output data voltages according to a sequential arrangement of data lines disposed in the second area, and wherein even-numbered output channels of the plurality of output channels output data voltages according to a reverse sequential arrangement of data lines disposed in the first area.

2. The display device of claim 1, further comprising:
a plurality of fan-out lines disposed in a fan-out area between the data driving circuit and the second area, the plurality of fan-out lines being electrically connected to the output channels.

3. The display device of claim 2, further comprising:
a plurality of bypass lines disposed in the first and second areas,
wherein each of the plurality of bypass lines includes a first straight portion disposed between the data lines disposed in the second area and including an end electrically connected to the fan-out line, a crossing portion crossing the data lines, and a second straight portion disposed between the data lines disposed in the first area and including an end electrically connected to the data lines arranged in the first area.

4. The display device of claim 2, wherein odd-numbered fan-out lines of the plurality of fan-out lines electrically connect the odd-numbered output channels to the data lines arranged in the second area, and even-numbered fan-out lines of the plurality of fan-out lines electrically connect the even-numbered output channels to the bypass lines arranged in the second area.

5. The display device of claim 2, wherein the display portion further includes a third area adjacent to the second area and corresponding to the straight edge part of the display portion.

6. The display device of claim 5, wherein the data driving circuit further includes a plurality of output channels configured to output data voltages according to a sequential arrangement of data lines arranged in the third area.

7. A display device, comprising:
a display portion having a substantially rectangular area with at least one rounded edge in which a plurality of data lines are disposed, the display portion including a first area corresponding to a rounded edge part and a second area corresponding to a straight edge part adjacent to the first area; and
a data driving circuit including an n-output demultiplexer configured to output a data voltage for each group formed by binding n output channels and a plurality of output channels configured to output a plurality of data voltages, wherein odd-numbered groups of the n output channels output data voltages according to a sequential arrangement of the data lines arranged in the second area, and even-numbered groups of the n output channels output data voltages according to a reverse sequential arrangement of the data lines arranged in the first area.

8. The display device of claim 7, further comprising:
a plurality of fan-out lines disposed in a fan-out area between the data driving circuit and the second area and, the plurality of fan-out lines being electrically connected to the output channels.

9. The display device of claim 8, further comprising:
a plurality of bypass lines disposed in the first and second areas,
wherein each of the plurality of bypass lines includes a first straight portion disposed between the data lines disposed in the second area and including an end electrically connected to the fan-out line, a crossing portion crossing the data lines, and a second straight portion disposed between the data lines disposed in the first area and including an end electrically connected to the data lines arranged in the first area.

10. The display device of claim 9, wherein, when the data driving circuit includes a 2-output demultiplexer, (4N−3)th fan-out lines electrically connected to (4N−3)th output channels are electrically connected to first data lines arranged in the second area, (4N−2)th fan-out lines electrically connected to (4N−2)th output channels are electrically connected to second data lines arranged in the second area, (4N−1)th fan-out lines electrically connected to (4N−1)th output channels are electrically connected to first straight portions of first bypass lines between the first data lines and the second data lines arranged in the second area, and (4N)th fan-out lines electrically connected to (4N)th output channels are electrically connected to first straight portions of second bypass lines between the second data lines and third data lines arranged in the second area, where N is a positive integer.

11. The display device of claim 9, wherein, when the data driving circuit includes a 4-output demultiplexer, (8N−7)th fan-out lines electrically connected to (8N−7)th output channels are electrically connected to first data lines arranged in the second area, (8N−6)th fan-out lines electrically connected to (8N−6)th output channels are electrically connected to second data lines arranged in the second area, (8N−5)th fan-out lines electrically connected to (8N−5)th output channels are electrically connected to third data lines arranged in the second area, (8N−4)th fan-out lines electrically connected to (8N−4)th output channels are electrically connected to fourth data lines arranged in the second area, (8N−3)th fan-out lines electrically connected to (8N−3)th output channels are electrically connected to first straight portions of first bypass lines between the first data lines and the second data lines arranged in the second area, (8N−2)th fan-out lines electrically connected to (8N−2)th output channels are electrically connected to first straight portions of second bypass lines between the second data lines and the third data lines arranged in the second area, (8N−1)th fan-out lines electrically connected to (8N−1)th output channels are electrically connected to first straight portions of third bypass lines between the third data lines and the fourth data lines arranged in the second area, and (8N)th fan-out lines electrically connected to (8N)th output channels are electrically connected to first straight portions of fourth bypass lines between the fourth data lines and fifth data lines arranged in the second area, where N is a positive integer.

12. The display device of claim 9, wherein the display portion further includes a third area adjacent to the second area and corresponding to the straight edge part.

13. The display device of claim 12, wherein the data driving circuit further includes a plurality of output channels configured to output data voltages according to a sequential arrangement of data lines arranged in the third area.

14. A display device comprising:
a display portion having a substantially rectangular area with at least one rounded edge in which a plurality of data lines are disposed, the display portion including a first area corresponding to a rounded edge part and a second area corresponding to a straight edge part adjacent to the first area; and
a data driving circuit including an n-output demultiplexer configured to output a data voltage for each group formed by binding n output lines and a plurality of output channels electrically connected to a plurality of output lines of the n-output demultiplexer, wherein odd-numbered output channels of the n output channels output data voltages according to a sequential arrangement of data lines arranged in the second area, and even-numbered output channels of the n output channels output data voltages according to a reverse sequential arrangement of data lines arranged in the first area.

15. The display device of claim 14, further comprising:
a plurality of fan-out lines disposed in a fan-out area between the data driving circuit and the second area and, the plurality of fan-out lines being electrically connected to the output channels.

16. The display device of claim 14, further comprising:
a plurality of bypass lines disposed in the first and second areas,
wherein each of the plurality of bypass lines includes a first straight portion disposed between the data lines disposed in the second area and including an end electrically connected to a fan-out line, a crossing portion crossing the data lines, and a second straight portion disposed between the data lines disposed in the first area and including an end electrically connected to the data line arranged in the first area.

17. The display device of claim 14, wherein, when the data driving circuit includes a 2-output demultiplexer, (4N−3)th output lines are electrically connected to (4N−3)th output channels, (4N−2)th output lines are electrically connected to (4N−1)th output channels, (4N−1)th output lines are electrically connected to (4N−2)th output channels, and (4N)th output lines are electrically connected to (4N)th output channels, where N is a positive integer.

18. The display device of claim 14, wherein, when the data driving circuit includes a 4-output demultipmexer, (8N−7)th output lines are electrically connected to (8N−7)th output channels, (8N−6)th output lines are electrically connected to (8N−5)th output channels, (8N−5)th output lines are electrically connected to (8N−3)th output channels, (8N−4)th output lines are electrically connected to (8N−1)th output channels, (8N−3)th output lines are electrically connected to (8N−6)th output channels, (8N−2)th output lines are electrically connected to (8N−4)th output channels, (8N−1)th output lines are electrically connected to (8N−2)th output channels, and (8N)th output lines are electrically connected to (8N)th output channels, where N is a positive integer.

19. The display device of claim 14, wherein the display portion further includes a third area adjacent to the second area and corresponding to a straight edge part.

20. The display device of claim 19, wherein the data driving circuit further includes a plurality of output channels configured to output data voltages according to a sequential arrangement of data lines arranged in the third area.

* * * * *